（12) United States Patent
Towata

(10) Patent No.: US 9,122,516 B2
(45) Date of Patent: Sep. 1, 2015

(54) INFORMATION PROCESSING SYSTEM, IMAGE FORMING APPARATUS, CONTROL METHOD, AND RECORDING MEDIUM FOR MANAGEMENT OF A JOB CONSISTING OF MULTIPLE TASKS

(71) Applicant: Hiroaki Towata, Kawasaki (JP)

(72) Inventor: Hiroaki Towata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/901,723

(22) Filed: May 24, 2013

(65) Prior Publication Data

US 2013/0332930 A1 Dec. 12, 2013

(30) Foreign Application Priority Data

Jun. 11, 2012 (JP) .................................. 2012-131672

(51) Int. Cl.
*G06F 9/46* (2006.01)
*G06F 9/48* (2006.01)
*G06F 9/50* (2006.01)

(52) U.S. Cl.
CPC .............. *G06F 9/4812* (2013.01); *G06F 9/485* (2013.01); *G06F 9/5027* (2013.01); *G06F 2209/5013* (2013.01)

(58) Field of Classification Search
None
See application file for complete search history.

(56) References Cited

U.S. PATENT DOCUMENTS 7,386,586 B1 * 6/2008 Headley et al. ............... 709/202
8,332,862 B2 * 12/2012 Isard et al. .................... 718/104
8,930,951 B2 * 1/2015 Berry ............................ 718/102

OTHER PUBLICATIONS

Windows Azure Queue, obtained at http://go.microsoft.com/?linkid=9734588, pp. 1-19, Dec. 2008 (English equivalent attached).

* cited by examiner

*Primary Examiner* — Gregory A Kessler
(74) *Attorney, Agent, or Firm* — Fitzpatrick, Cella, Harper & Scinto

(57) ABSTRACT

A flow service server group manages a job consisting of multiple tasks generated according to a user request, and a task server acquires a task included in the aforementioned managed job if a processing standby status exists, and carries out specific task processing. The task server notifies the flow service server group at a fixed interval that task processing is in progress. The flow service server group then issues a command to the task server that has not completed task processing within a prescribed time to suspend the task processing, and issues a command to a task server capable of task processing that is identical to the task processing to alternatively execute the task processing.

11 Claims, 17 Drawing Sheets

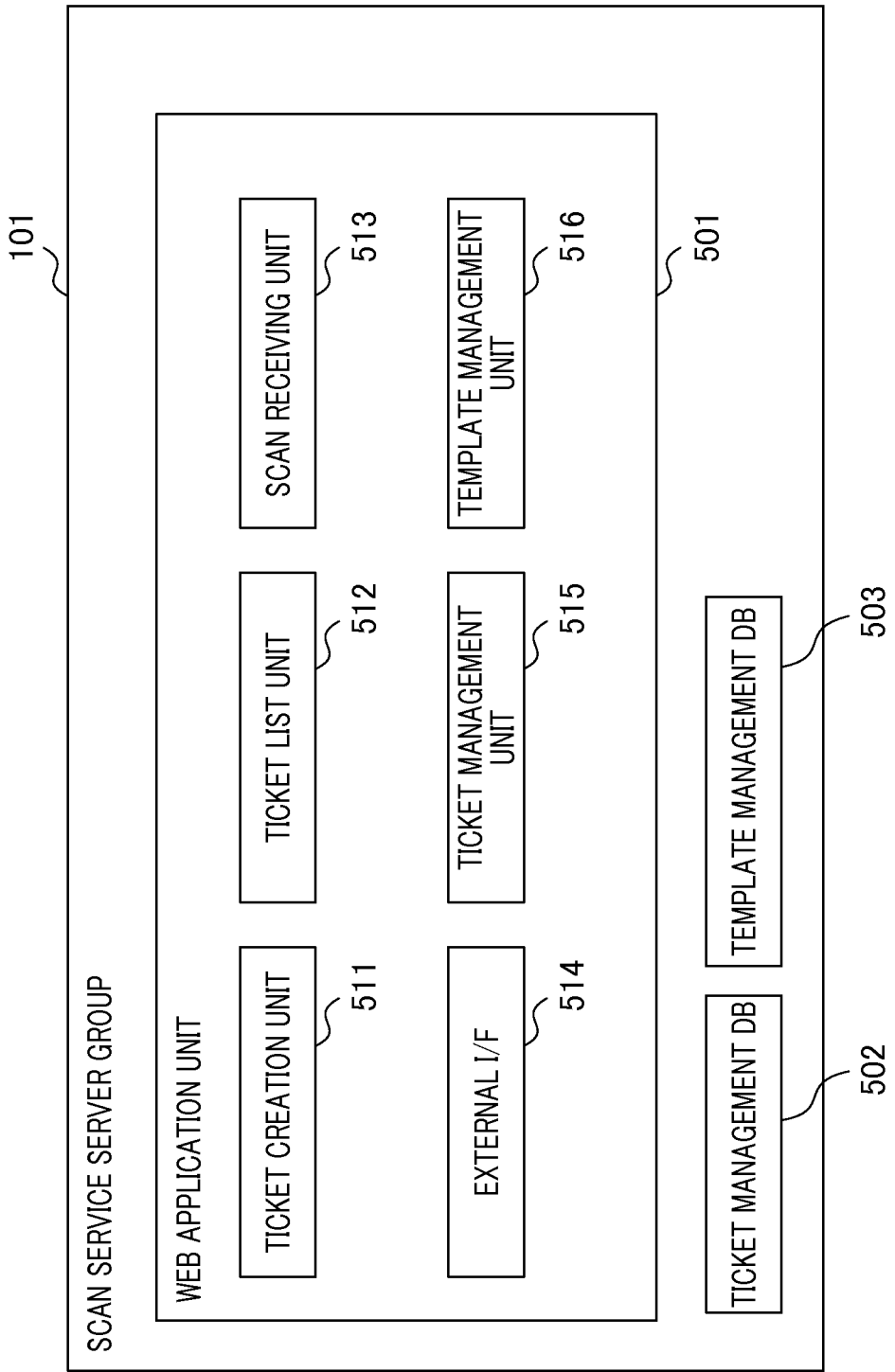

| User ID | Ticket ID | Route ID | Parameters |
|---|---|---|---|
| user1 | 00001 | 001 | Width:100,Height:200,FolderPath:¥User¥user1¥ |
| user2 | 00002 | 002 | Uri:http://cloudservice1/document/ accessToken:abcdefghijklmnxxxxxxxxxxxx, expires_in:2011/12/31 12:00:00 |
| user1 | 00003 | 003 | |
| user3 | 00004 | 002 | Uri:http://cloudservice2/document/ accessToken:opqrstuvwxxxxxxxxxxxxxxx, expires_in:2011/1/1 12:00:00 |
| user4 | 00005 | 003 | |
| user5 | 00006 | 003 | |

| Template ID | Template Name | Route ID |
|---|---|---|
| 01 | Scan To Cloud 1 | 001 |
| 02 | Scan To Cloud 2 | 002 |
| 03 | JPEG To Cloud 1 | 003 |

| Task ID | Task Name | Suspension Time | Status Notification Time | Maximum Processing Time (Real Measurement) | Maximum Processing Time (Projection) |
|---|---|---|---|---|---|
| Task1 | PDF to PDL conversion | 610 | 60 | 312 | 600 |
| Task2 | Saving to Cloud 1 | 40 | 30 | 31 | 30 |
| Task3 | Data conversion service linkage | 130 | 30 | 180 | 120 |
| Task4 | Saving to Cloud 2 | 70 | 60 | 48 | 60 |
| Task5 | Data acquisition by Cloud 1 | 310 | 30 | 163 | 300 |
| Task6 | PDF to JPEG conversion | 1210 | 30 | 677 | 1200 |
| Task7 | Saving to Cloud 3 | 70 | 30 | 31 | 60 |
| Task8 | Scan data saving | 40 | 30 | 12 | 30 |
| Task9 | Image processing | 610 | 60 | 556 | 600 |
| ... | | | | | |

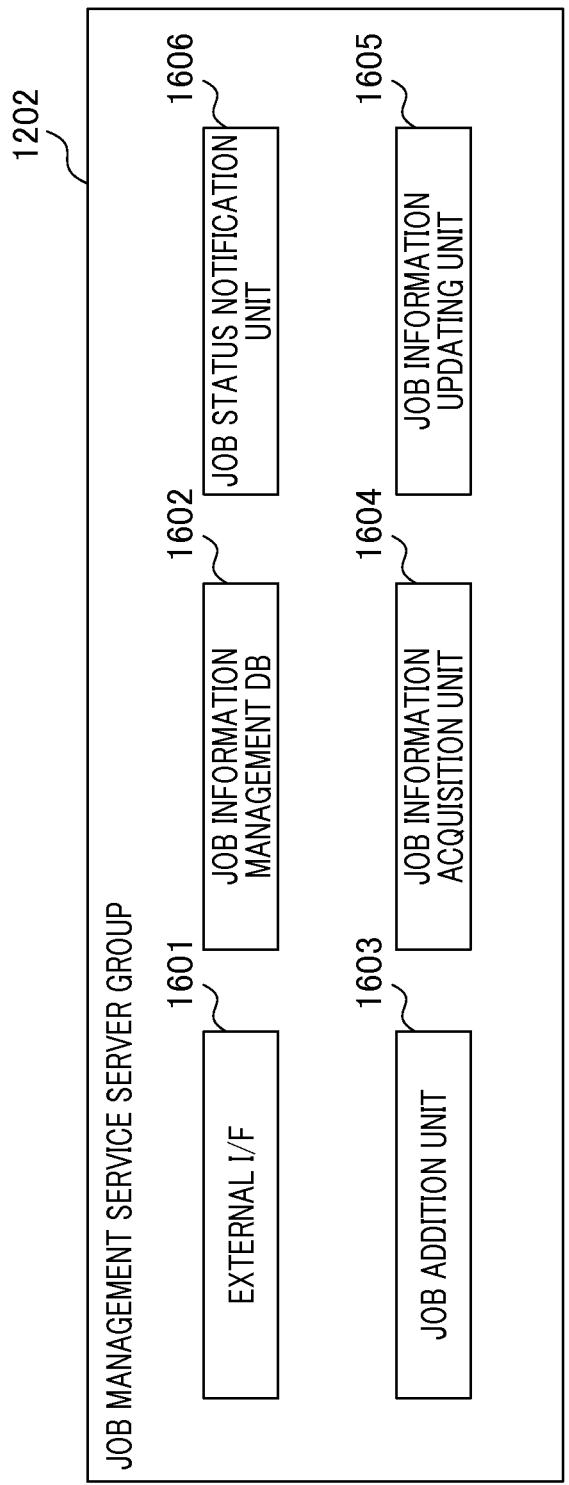

| Job ID | Route ID | File Group ID | Current Task ID | Status | Final Updating Time | Parameters | Time Stamp | Final Status Notification Time |
|---|---|---|---|---|---|---|---|---|
| 1 | 001 | Job1 | Task9 | 0 | 2011/09/15 12:00:00 | Width:100,Height:200,FolderPath:¥User¥user1¥ | 6a3e232a-b93b-4816-ac94-99d1b29ef75f | 2011/09/15 12:00:30 |
| 2 | 002 | Job2 | Task1 | 0 | 2011/09/15 12:30:00 | Uri:http://cloudlservice1/document/ accessToken:opqrstuvwxxxxxxxxxxxxxxx, expires_in:2011/12/31 12:00:00 | 1ca36a45-0a77-4a13-8aba-e8b9a7c6eaaa | 2011/09/15 12:30:30 |
| 3 | 003 | Job3 | Task2 | 1 | 2011/09/15 13:00:00 | | ec74a44b-36d3-45e0-91d4-ee4f2ee9a53b | 2011/09/15 13:00:30 |
| 4 | 002 | Job4 | Task5 | 2 | 2011/09/15 12:40:00 | Uri:http://cloudlservice2/document/ accessToken:opqrstuvwxxxxxxxxxxxxxxx, expires_in:2011/1/1 12:00:00" | 6a2f6e4e-e0e5-4561-9055-3eedec166cc3 | 2011/09/15 12:40:30 |

1701  1702  1703  1704  1705  1706  1707  1708  1709

INFORMATION PROCESSING SYSTEM, IMAGE FORMING APPARATUS, CONTROL METHOD, AND RECORDING MEDIUM FOR MANAGEMENT OF A JOB CONSISTING OF MULTIPLE TASKS

BACKGROUND OF THE INVENTION

1. Field of the Invention

The present invention relates to an information processing system, an image forming apparatus, a control method, and a recording medium.

2. Description of the Related Art

As modes for conducting various types of processing on a server computer side, technologies such as cloud computing systems and SaaS (Software as a Service) have been proposed. With cloud computing, it is possible to simultaneously process requests from many clients by utilizing many computing resources, and performing data conversion and data processing in a dispersed manner. By fully utilizing the characteristics of cloud computing, systems have been proposed in which numerous jobs are scalably processed by implementing a series of processing steps on a server with inter-linkage of precisely prescribed tasks, and by simultaneously processing these in parallel. Such a system is hereinafter referred to as a "cloud system."

In a cloud system, in order to enhance scalability of computer resources and prevent system down-time when requests from clients peak, there is a mode in which a task execution processing unit non-synchronously acquires tasks contained in a job, and executes job processing (title: Windows Azure Queue, Queue Storage Programming, URL: http://go.microsoft.com/?linkid=9734588, issue date: December 2008).

A task execution processing unit is described with a back-end unit as follows. In cases where an anomaly occurs in a back-end unit during task execution processing and where prolonged job processing does not terminate, in order to execute the job processing again, it is necessary to have a retry function which is executed by a back-end unit that is separate from the back-end unit in which the anomaly occurred. Anomalies in task execution processing arise when hardware malfunctions occur in the computer that is running the task, or due to task software bugs and the like. With respect to cloud systems, a method has been proposed in which retry is executed with a separate back-end unit when job execution has been ongoing for a fixed period of time.

However, in a conventional cloud system, the following case may occur as a result of the retry function when job processing is transferred to another back-end unit. In a conventional cloud system, even if the back-end unit in which an anomaly has occurred during execution of job processing transfers the job processing to another back-end unit, its own job processing continues to be executed. Therefore, the back-end unit in which the anomaly has occurred cannot process the next job until the job in the process of execution terminates. As a result, the system as a whole wastefully expends computer resources.

In the case of processing in which job content affects an external system, the external system is doubly affected by the back-end unit already in the process of executing job processing and the back-end unit to which the job processing has been newly transferred, producing systemic inconsistencies. For example, there is processing in which an external system is affected by a job that saves data in the external system or a job that sends a message to the external system.

SUMMARY OF THE INVENTION

The system of the present invention prevents waste of computer resources which could occur in the case where an anomaly occurs in a back-end unit that executes job processing by non-synchronously acquiring tasks contained in a job, and where the job processing is transferred to another back-end unit in order to improve throughput.

An information processing apparatus of one embodiment of the present invention has a job management unit which manages a job consisting of multiple tasks that is generated in accordance with a user request, and multiple back-end units which acquire tasks from the aforementioned job management unit if a processing standby status exists, and which carry out specific task processing. The aforementioned back-end units periodically notify the aforementioned job management unit that task processing is in progress. The aforementioned job management unit issues a command to suspend task processing to the aforementioned back-end unit that has not completed the aforementioned task processing within a prescribed time, and issues a command for alternative execution of task processing to a back-end unit capable of task processing that is identical to the aforementioned task processing.

Further features of the present invention will become apparent from the following description of exemplary embodiments with reference to the attached drawings.

BRIEF DESCRIPTION OF THE DRAWINGS

FIG. 4 illustrates an exemplary configuration of a scan service server group.

FIG. 7A and FIG. 7B illustrate examples of a ticket management DB and a template management DB.

FIG. 12 illustrates an example of a task information management DB.

FIG. 13 illustrates an exemplary configuration of a job management service server group.

FIG. 14 illustrates an example of a job information management DB.

DESCRIPTION OF THE EMBODIMENTS (Embodiment 1)

Figure 1:
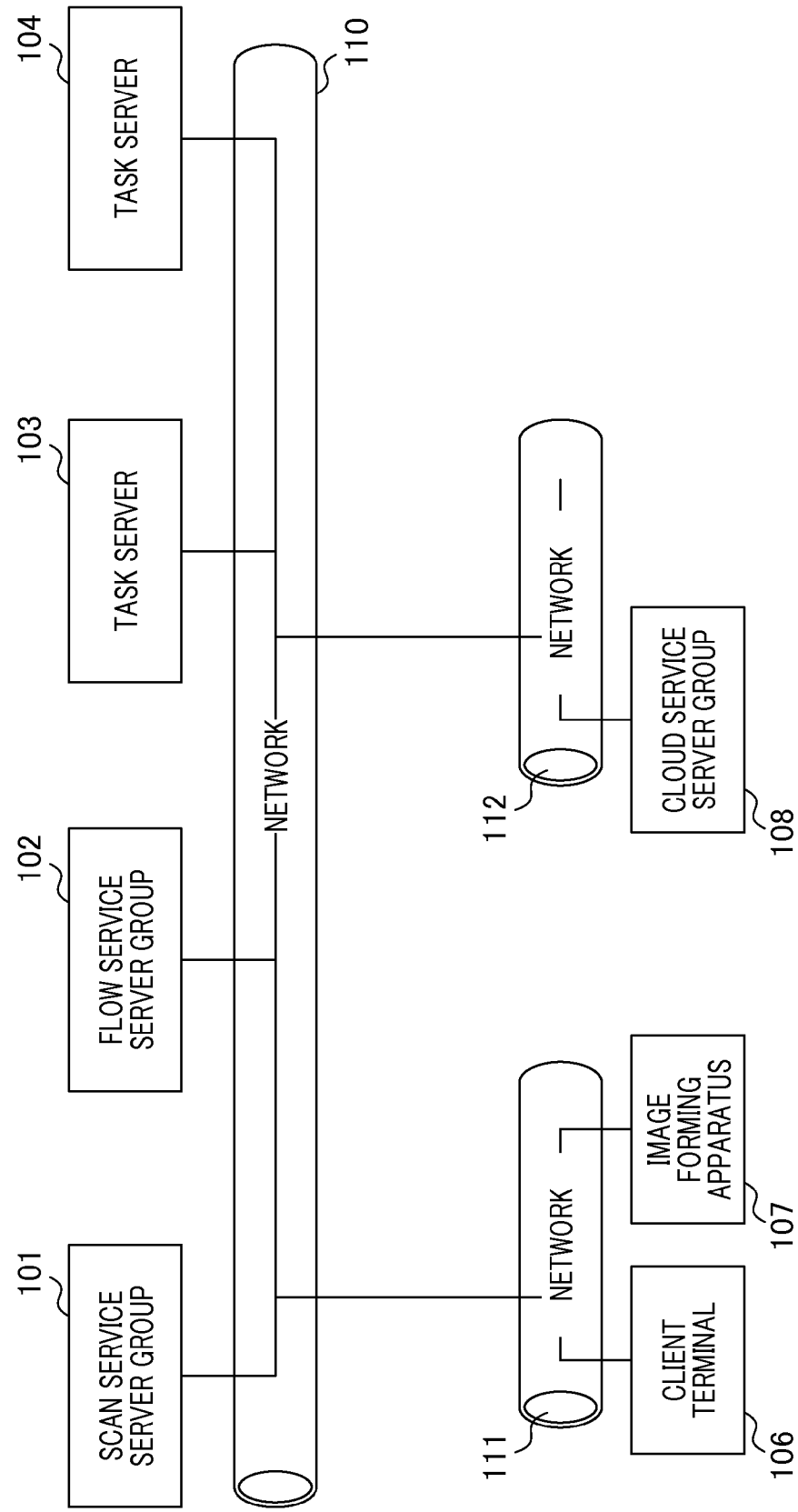
FIG. 1 illustrates an overall configuration of an information processing system of the present embodiment.

FIG. 1 is a diagram which illustrates an overall configuration of an information processing system of the present embodiment. The information processing system of the present embodiment is a cloud system that provides an image processing service to a user of a client terminal 106.

The information processing system of FIG. 1 is provided with a scan service server group 101, a flow service server group 102, task servers 103, 104, a client terminal 106, an image forming apparatus 107, and a cloud service server 108. In the example shown in FIG. 1, there are two task servers, but the number of task servers with which the information processing system is provided is not limited to two. The information processing system may be provided with multiple task servers in an optional quantity.

From the scan service server group 101 to the task server 104, there is communicable connection via a network 110. From the scan service server group 101 to the task server 104, there is communicable connection with the client terminal 106 and the image forming apparatus 107 via the network 110 and a network 111. In addition, from the scan service server group 101 to the task server 104, there is communicable connection with the cloud service server group 108 via the network 110 and a network 112.

The task servers, the client terminal 106, the image forming apparatus 107, and the cloud service server group 108 are provided in multiple units. The networks 110 to 112 are, for example, LAN, WAN, telephone circuitry, dedicated digital circuitry, ATM or frame relay circuitry, cable television circuitry, data broadcasting wireless circuitry or the like of an internet or the like. LAN is an abbreviation for Local Area Network. WAN is an abbreviation for Wide Area Network. ATM is an abbreviation for Asynchronous Transfer Mode.

The networks 110 to 112 may be communication networks implemented by a combination of the LAN to the data broadcasting wireless circuitry enumerated above. That is, it is sufficient that the networks 110 to 112 are capable of transmitting and receiving data. In this example, as the information processing system of the present embodiment is a cloud system, the networks 110 and 112 are the Internet, and the network 111 is a network within a corporation or a network of a service provider.

The scan service server group 101, the flow service server group 102, and the task servers 103, 104 have multiple server computer groups. These server computer groups configure the cloud service server group, and provide cloud services to the user.

In this example, the image forming apparatus 107 executes scanning to generate image data in response to a request from a user of the client terminal 106, and inputs the generated image data into the scan service server group 101. The scan service server group 101 functions as a job input unit which inputs a job corresponding to the image data into the flow service server group 102. In this example, a job is configured from multiple tasks. For example, if a job issued in accordance with a user request is a scan job, one may conceive of the case where there is performance of a step in which image processing of a scanned image is conducted, and a step in which the scanned image for which image processing was conducted is saved. By delimiting the respective steps in units referred to as "tasks," the present invention configures a single job from multiple tasks. The advantage of this format is that a diversity of job processing can be conducted by combining multiple tasks. The flow service server group 102 manages jobs that are input. That is, the flow service server group 102 functions as a job management unit that manages jobs configured from multiple tasks generated in response to user requests.

The task servers 103, 104 non-synchronously request and acquire tasks contained in a job managed by the flow service server group 102. With respect to a task corresponding to the task server that issued an acquisition request among the multiple tasks contained in a managed job, the flow service server group 102 delivers a task in processing standby status to the task server that issued the acquisition request. The task server that receives the task carries out specified job processing. For example, the task server conducts image processing with respect to image data that is subject to processing, and conducts processing which transmits the image data to another cloud service server group that offers a file sharing function. That is, the task server functions as a back-end unit that acquires a task from the flow service server group 102 if a processing standby status exists, and that performs specific task processing.

Note that another cloud service server group 108 different from the cloud service server group configured by the scan service server group 101 to the task server 104 is publicly available on the Internet, and is also executed on multiple server computers.

The client terminal 106 is, for example, a desktop personal computer, a notebook personal computer, a mobile personal computer, a PDA (personal data assistant), or the like. The client terminal 106 may also be a mobile phone incorporating a program execution environment. The client terminal 106 incorporates an environment in which a program such as a web browser (an internet browser, a WWW browser, a browser provided for World Wide Web use) is run.

The control method of the present embodiment is a method for controlling the information processing system illustrated in FIG. 1. The computer program of the present embodiment runs this control method on a computer.

Figure 2:
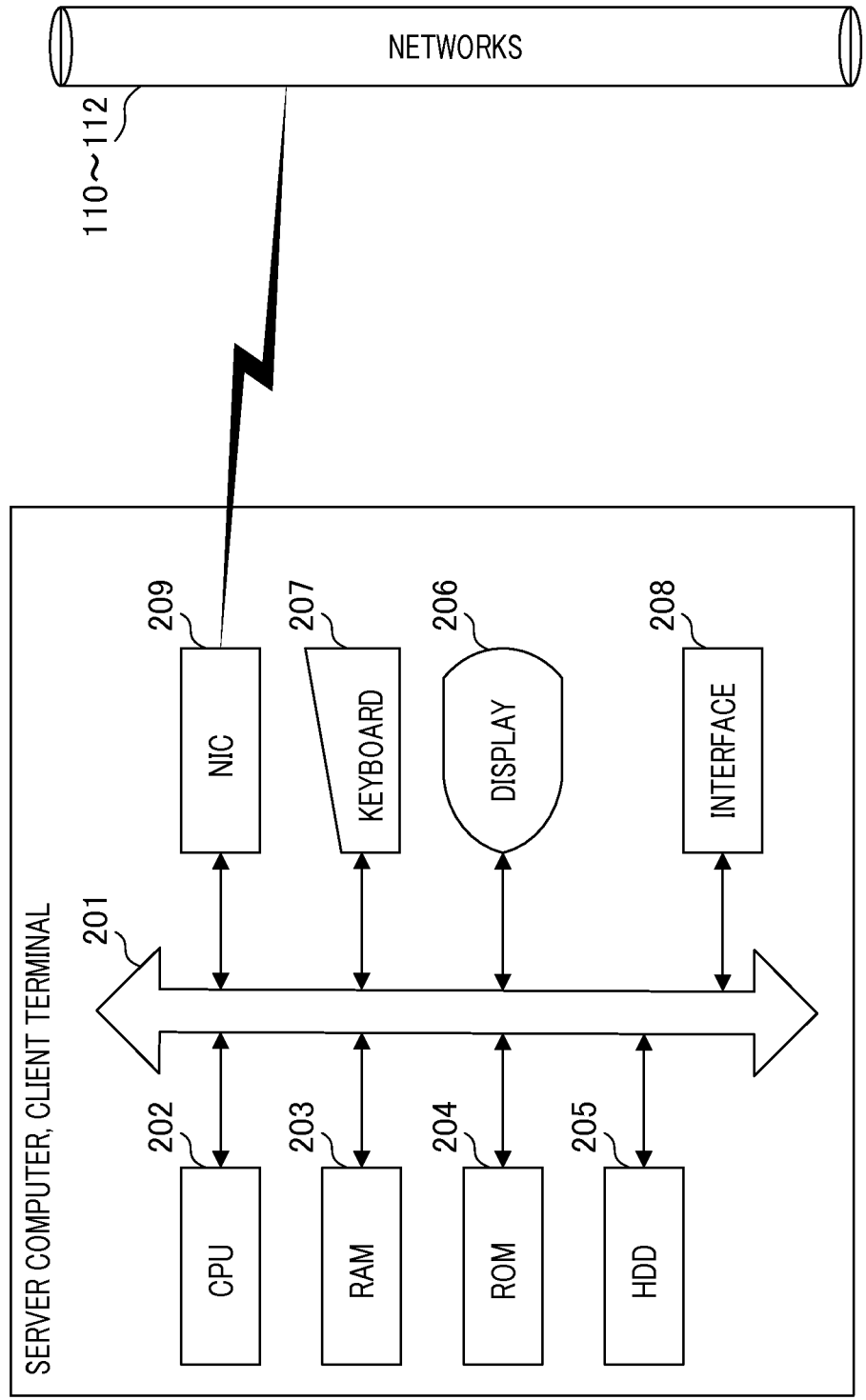
FIG. 2 is an exemplary hardware configuration diagram of a server computer that implements a client terminal, a scan service server group, a flow service server group, and task servers.

FIG. 2 is an example of a hardware configuration diagram of a server computer which implements a client terminal, a scan service server group, a flow service server group, and task servers. The client terminal 106 and the server computer are provided with a CPU 202, a RAM 203, a ROM 204, and an HDD 205. CPU is an abbreviation for Central Processing Unit. RAM is an abbreviation for Random Access Memory. ROM is an abbreviation for Read Only Memory. HDD is an abbreviation for Hard Disk Drive. In addition, the client terminal 106 and the server computer are provided with a display 206, a keyboard 207, an interface 208, and an NIC 209. NIC is an abbreviation for Network Interface Card.

The CPU 202 conducts overall control of the apparatus. The CPU 202 runs application programs, OS and the like that are stored in the HDD 205, and conducts control that temporarily stores information, files and the like required for running the programs in the RAM 203. OS is an abbreviation for Operating System. The ROM 204 is a storage unit, and internally stores various types of data such as basic I/O programs. The RAM 203 is a temporary storage unit, and functions as the main memory, work area or the like of the CPU 202. The HDD 205 is an external storage unit, and functions as a large-capacity memory that stores application programs such as web browsers, service group programs, OS, related programs, and the like.

The display 206 is a display unit, and conducts display of commands and the like that are input from the keyboard 207.

The interface 208 is an external device I/F, and connects printers, USB equipment, and peripheral equipment. The keyboard 207 is an instruction input unit. A system bus 201 directs the flow of data within the apparatus, and is connected to all components from the CPU 202 to the interface 208. The interface NIC 209 conducts data exchange with external devices via the interface 208 and the networks 110 to 112. The apparatus configuration shown in FIG. 2 is exemplary, and one is not limited to the exemplary configuration of FIG. 2. For example, the storage destination of data and programs may be any one of the RAM 203, the ROM 204, and the HDD 205 according to the characteristics thereof.

Figure 3A:
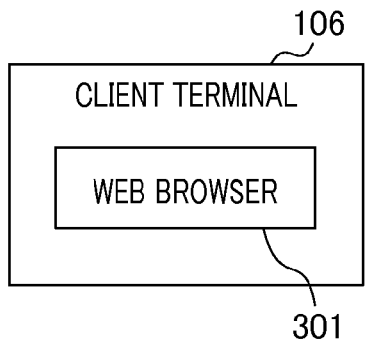
FIG. 3A and FIG. 3B illustrate exemplary configurations of a client terminal and an image forming apparatus.
Figure 3B:
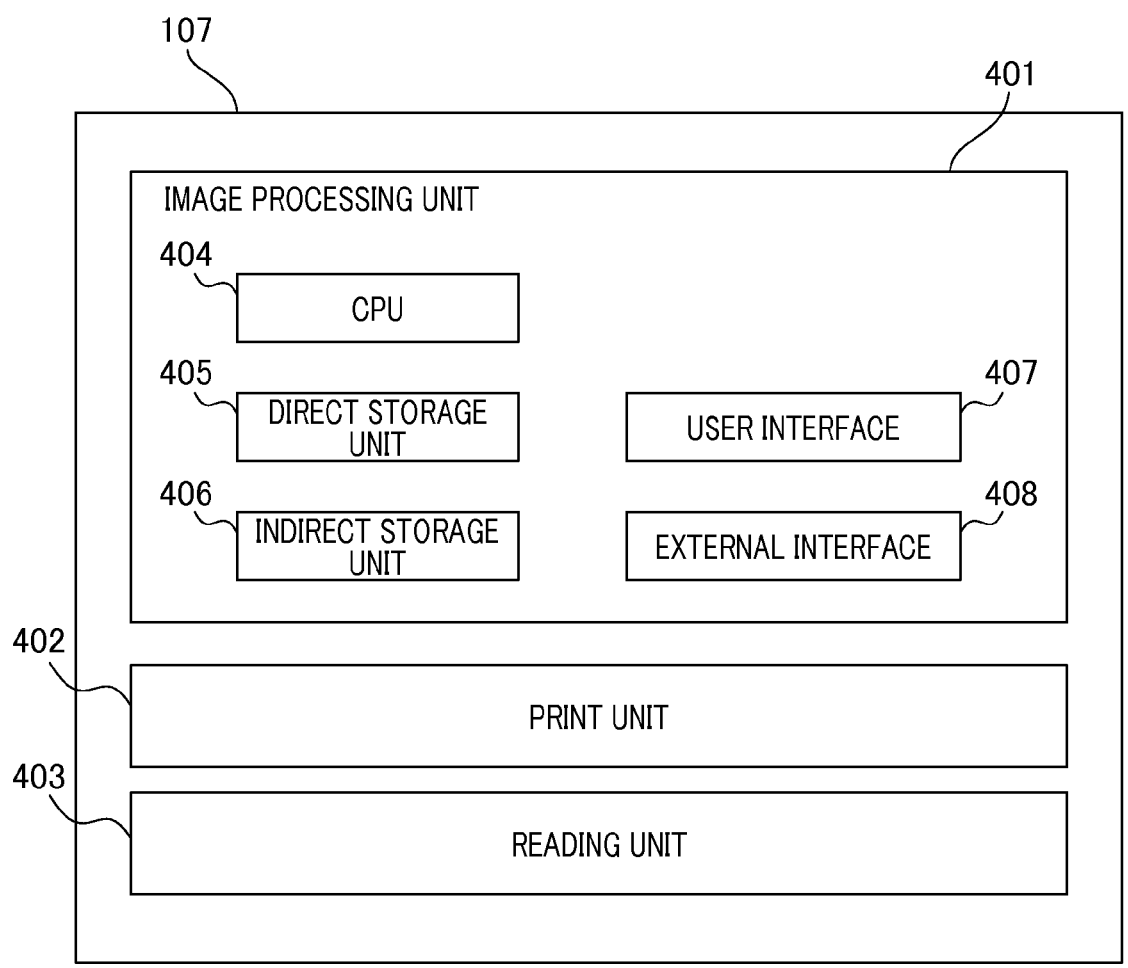

FIG. 3A and FIG. 3B are drawings which illustrate exemplary configurations of a client terminal and an image forming apparatus. FIG. 3A illustrates an exemplary configuration of the client terminal 106. The client terminal 106 is provided with a web browser 301. The web browser 301 conducts transmission of requests to web applications that the scan service server group 101 (FIG. 1) provides, as well as display of responses. A user who utilizes the cloud service utilizes the web browser 301 of the client terminal 106 to utilize the cloud service.

FIG. 3B illustrates an exemplary configuration of the image forming apparatus 107. In this example, the image forming apparatus 107 is an apparatus that combines a scan function and a print function. For purposes of implementing a scan service, the image forming apparatus 107 may also be a scan-dedicated apparatus without a print function.

The image forming apparatus 107 is provided with an image processing unit 401, a print unit 402, and a reading unit 403. The image processing unit 401 executes image processing. For example, the image processing unit 401 generates print data in accordance with print settings. The print unit 402 conducts printing output of print data generated by the image processing unit 401 to a medium (e.g., a paper medium). The reading unit 403 reads, for example, image data using a scanning apparatus that is not illustrated in the drawing.

The image processing unit 401 is provided with a CPU 404, a direct storage unit 405, an indirect storage unit 406, a user interface 407, and an external interface 408.

The CPU 404 runs a prescribed program, and issues instructions for various types of control of the image forming apparatus 107. CPU 404 is an abbreviation for Central Processing Unit. The direct storage unit 405 is a work memory that is used when the CPU 404 runs a program. The program that is run by the CPU 404 is loaded into the direct storage unit 405. Alternatively, the CPU 404 may also be a multiprocessor.

The direct storage unit 405 is implemented with RAM. The indirect storage unit 406 stores various types of programs including application programs and platform programs. When executing the various types of programs stored in the indirect storage unit 406, the CPU 404 transfers these various programs to the direct storage unit 405. The indirect storage unit 406 is implemented by a SSD (solid-state drive) or an HDD (hard disk drive).

In this example, the indirect storage unit 406 stores a platform program which implements a platform that can run a new application independently developed by a user with the image forming apparatus 107. According to the platform, it is also possible to customize the operating screen of the image forming apparatus 107.

A platform implementation method is described below. The CPU 404 transfers the platform program stored in the indirect storage unit 406 to the direct storage unit 405. When transfer is complete, the CPU 404 enters a state in which the platform program (e.g., Java®) can be run. In this example, running of the platform program by the CPU 404 is referred to as activating the platform. The platform is operated with firmware of the image forming apparatus 107. The platform program provides an environment for executing an application program described with object-orientation.

Next, a detailed description is given of a method for running an application program on a platform. In this example, scan software which transmits scanned images to a cloud service operates on the platform. The scan software receives a scan ticket list by a communication protocol such as HTTP (Hyper Text Transfer Protocol) from the scan service server group 101 that is connected via a network. The scan ticket records settings for scanning, as well as information concerning subsequent processing flows. The software unit which implements the scan software by running it is hereinafter referred to as the scan software unit.

The user selects a scan ticket from the scan ticket list displayed by the scan software unit, and can complete scanning by causing read-in of the manuscript. The information of the scan ticket selected by the user and the scanned image data are together transmitted to the scan service server group 101 by the scan software unit. In this manner, control of the image forming apparatus 107 can be carried out by running an application program on the platform.

Next, a description is given of a method of executing an application program. The activated platform transfers an application program stored in the indirect storage unit 406 to the direct storage program 405. When transfer is completed, the platform enters a state in which the application program can be run. The platform then runs the application program. The platform function that can be provided by running an application program in this manner is referred to in this example as a platform application. Furthermore, the platform enables partial execution of the various processing steps of the flowcharts disclosed in the present embodiment.

The user interface 407 receives a processing request from the user. For example, the user interface 407 receives a signal in response to an instruction that is input by the user through a keyboard, a mouse, or the like. The external interface 408 enables receipt of data from an external device or transmission of data to an external device. The aforementioned external device is, for example, an external storage device such as an external HDD or an external USB memory, or a separate host computer connected via a network, or a separate device such as an image forming apparatus. The image forming apparatus 107 is capable of communicating with the scan service server group 101 and the client terminal 106 via the networks 110 and 111.

Next, a description is given of the respective service server groups of the scan service server group 101 and the task servers 103, 104 that provide the cloud service. Furthermore, in conjunction with description of the respective service server groups, the flow of scan processing is also described.

FIG. 4 is a drawing which illustrates an exemplary configuration of a scan service server group. The scan service server group 101 is a service server group which provides scan functions in a cloud service.

The scan service server group 101 is provided with a web application unit 501, a ticket management DB 502, and a template management DB 503. The scan service server group 101 is provided to the user by executing various types of processing by these components.

The web application unit 501 provides an application program that offers a scan function. The web application unit 501 is provided with a ticket creation unit 511, a ticket list unit 512, a scan receiving unit 513, an external I/F 514, a ticket management unit 515, and a template management unit 516. The ticket creation unit 511 carries out a series of functions whereby a user creates a scan ticket. The scan ticket consists of definition information which includes settings during scanning of manuscripts by the image forming apparatus 107, and definition of subsequent processing flows, as well as parameters for the tasks to be executed in the respective processing flows, and the like.

A description is given below of the processing for scan ticket creation. The web browser 301 of the client terminal 106 issues a ticket creation screen request (in this example, a scan ticket creation screen request) in accordance with user operation to the scan service server group 101. In accordance with the ticket creation screen request, the ticket creation unit 511 provides the client terminal 106 with a ticket creation screen (in this example a scan ticket creation screen). The web browser 301 of the client terminal 106 displays the scan ticket creation screen.

Figure 5:
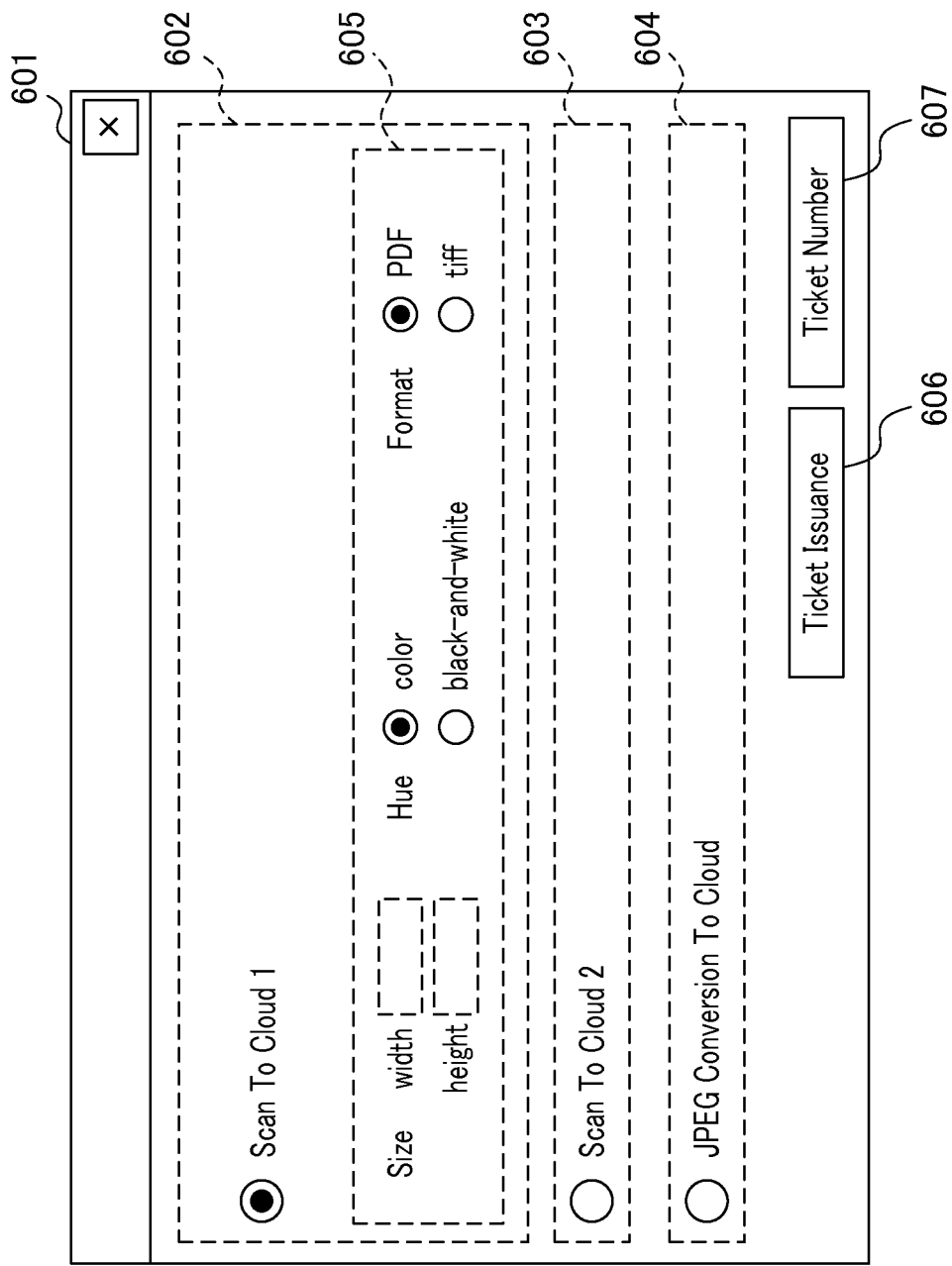
FIG. 5 illustrates an example of a scan ticket creation screen.

FIG. 5 is a drawing which illustrates an exemplary scan ticket creation screen. Templates 602 to 604 are displayed in a scan ticket creation screen 601. A template is definition information for establishing settings for image processing (e.g., scan processing). For example, the template 602 defines processing which transmits image data obtained by scanning to a cloud 1. The template management unit 516 manages the templates stored in the template management DB 503.

The ticket creation unit 511 acquires the templates from the template management DB 503, and provides the web browser 301 with a scan ticket creation screen including the acquired templates.

When the user selects a template to be executed from among the templates displayed on the scan ticket creation screen 601, the web browser 301 displays a detailed settings screen 605. The detailed settings screen 605 is a screen for establishing detailed ticket settings.

In the example shown in FIG. 5, the templates and the detailed settings screen 605 are displayed within the same screen, but the web browser 301 may be configured to open the detailed settings screen 605 in a screen (a separate window) that is different from the screen in which the templates are displayed. In the detailed settings screen 605, the user can establish scan settings corresponding to the selected template. For example, as examples of scan settings, there are settings such as size, hue (color and black-and-white), and scan data format, as shown in FIG. 5. When the user presses a ticket issuance button 606 after establishing the detailed settings, a scan ticket creation request is issued to the scan service server group 101 from the web browser 301. The scan ticket creation request is a request to ask scan ticket creation, and includes information for ticket settings that are established on a scan ticket creation screen.

Based on the ticket setting information contained in the scan ticket creation request, the ticket creation unit 511 creates a scan ticket, and instructs the ticket management unit 515 to save the information (ticket information) relating to the scan ticket. The ticket management unit 515 saves the ticket information in the ticket management DB 502 in accordance with the instruction from the ticket creation unit 511.

The external I/F 514 communicates with the scan software unit that operates in the image forming apparatus 107. Specifically, the external I/F 514 accepts access to the functions of the ticket list unit 512 of the functions of the scan receiving unit 513 from the scan software unit. The ticket list unit 512 generates a list of tickets based on the ticket information saved in the ticket management unit 515 in accordance with a request from the image forming apparatus 107, and returns the generated list to the image forming apparatus 107. The image forming apparatus 107 displays the acquired ticket list on a ticket list screen.

Figure 6:
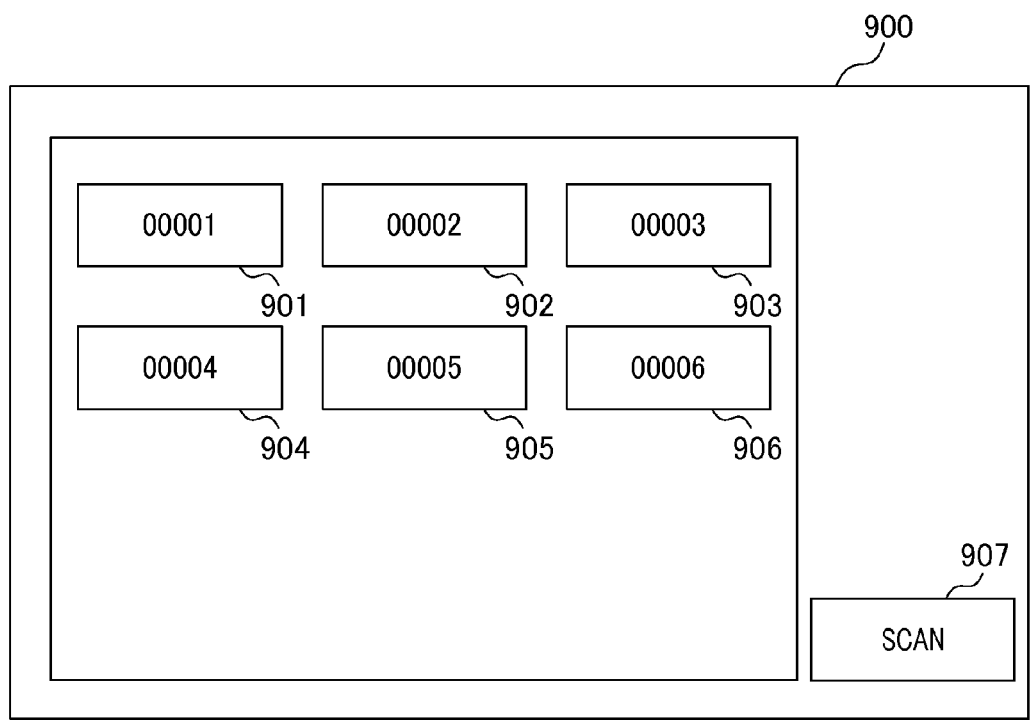
FIG. 6 illustrates an example of a ticket list screen.

FIG. 6 is a drawing which illustrates an exemplary ticket list screen. In this example, tickets 901 to 906 (in this example, scan tickets) are displayed on a ticket list screen 900. The user selects any one of the scan tickets displayed on the ticket list screen 900, sets paper in a scanning device with which the image forming apparatus 107 is equipped, and executes scanning upon processing a scan button 907. The image forming apparatus 107 then transmits the scan ticket selected in the ticket list screen and the image data obtained from scanning execution to the scan service server group 101.

The scan receiving unit 513 with which the scan service server group 101 is provided receives the scan ticket and the image data from the image forming apparatus 107. The scan receiving unit 513 then inputs the received image data into the flow service server group 102.

FIG. 7A and FIG. 7B are drawings which illustrate examples of a ticket management DB and a template management DB. FIG. 7A illustrates one example of the ticket management DB 502. The ticket information stored by the ticket management DB 502 has the data items of a user ID 701, a ticket ID 702, a route ID 703, and a parameter 704. The user ID 701 is identification information which uniquely identifies the user who created the ticket. The ticket ID 702 is identification information which uniquely identifies a ticket. The ticket ID 702 is generated by the ticket creation unit 511 when a ticket issuance button 606 is pressed in the scan ticket creation screen shown in FIG. 5, and is saved in the ticket management DB 502.

The route ID 703 is identification information which uniquely identifies route information. Route information is information which shows the processing (e.g., scan processing) that corresponds to the template selected in the scan ticket creation screen 601. Specifically, route information is information concerning the route that links the respective tasks contained in the job that implements the processing corresponding to the template, and includes processing sequence information that illustrates the task processing sequence in the job. That is, route information is information that serves to define the linkage of tasks in a unit referred to as a route.

In the case where the user selects a template, and executes scanning, the scan data is processed in the order of the tasks defined in association with the route ID 703. The parameter 704 is scan setting information that is set in the detailed settings screen 605 shown in FIG. 5.

FIG. 7B is a drawing which illustrates an exemplary template management DB. The template information is set in the template management DB 503. Template information is information which links the template displayed on the ticket creation screen and the route information managed by a route information management DB 1301 described below with reference to FIG. 11. Template information has the data items of a template ID 801, a template name 802, and a route ID 803.

The template ID 801 is identification information which uniquely identifies a template. The template name 802 is the name of the template. The template name is displayed on the ticket creation screen 601 shown in FIG. 5. The route ID 803 is an external key to the route ID 1401 (FIG. 11) contained in the route information that is managed by the route information management DB 1301.

Figure 8:
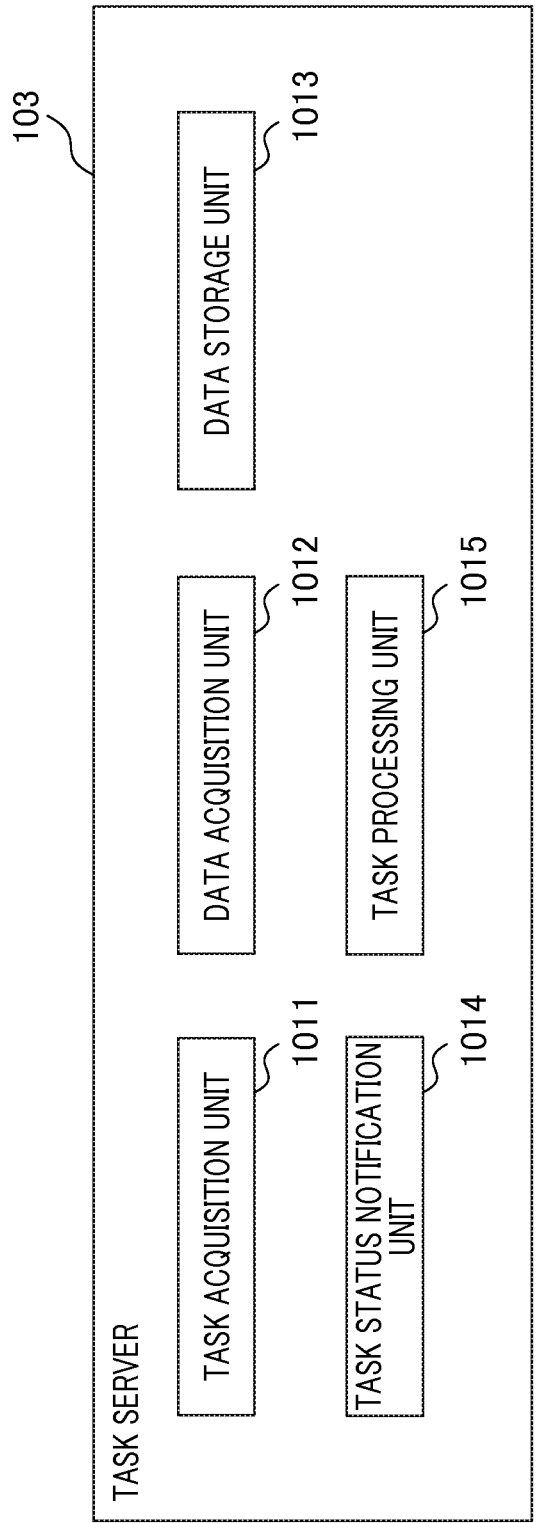
FIG. 8 illustrates an exemplary configuration of a task server.

FIG. 8 is a drawing which illustrates an exemplary configuration of a task server. In this example, the configuration of the task server 103 is described. The configuration of the task server 104 is identical to that of the task server 103. The task server 103 conducts OCR processing of image data, and conducts processing that embeds the text data of the OCR result in the image data. The task server 104 conducts processing which uploads and stores image data with respect to specific services that provide storage functions in the cloud service server group 108.

As shown in FIG. 8, the task server 103 is provided with a task acquisition unit 1011, a data acquisition unit 1012, a data storage unit 1013, a task status notification unit 1014, and a task processing unit 1015. The task acquisition unit 1011 periodically issues inquiries to the flow service server group 102 to acquire tasks that can be processed by the task server 103. Based on the task information acquired by the task acquisition unit 1011, the data acquisition unit 1012 acquires image data to be processed from the flow service server group 102. The task processing unit 1015 conducts a variety of processing with respect to the image data acquired by the data acquisition unit 1012. In addition, the task processing unit 1015 delivers the processing results of the task processing unit 1015 to the data storage unit 1013. The data storage unit 1013 stores the processing results received from the task processing unit 1015 in the flow service server group 102. The task status notification unit 1014 periodically provides the flow service server group 102 with status notifications. Status notifications are notifications that the task server is in the process of task processing.

Figure 9:
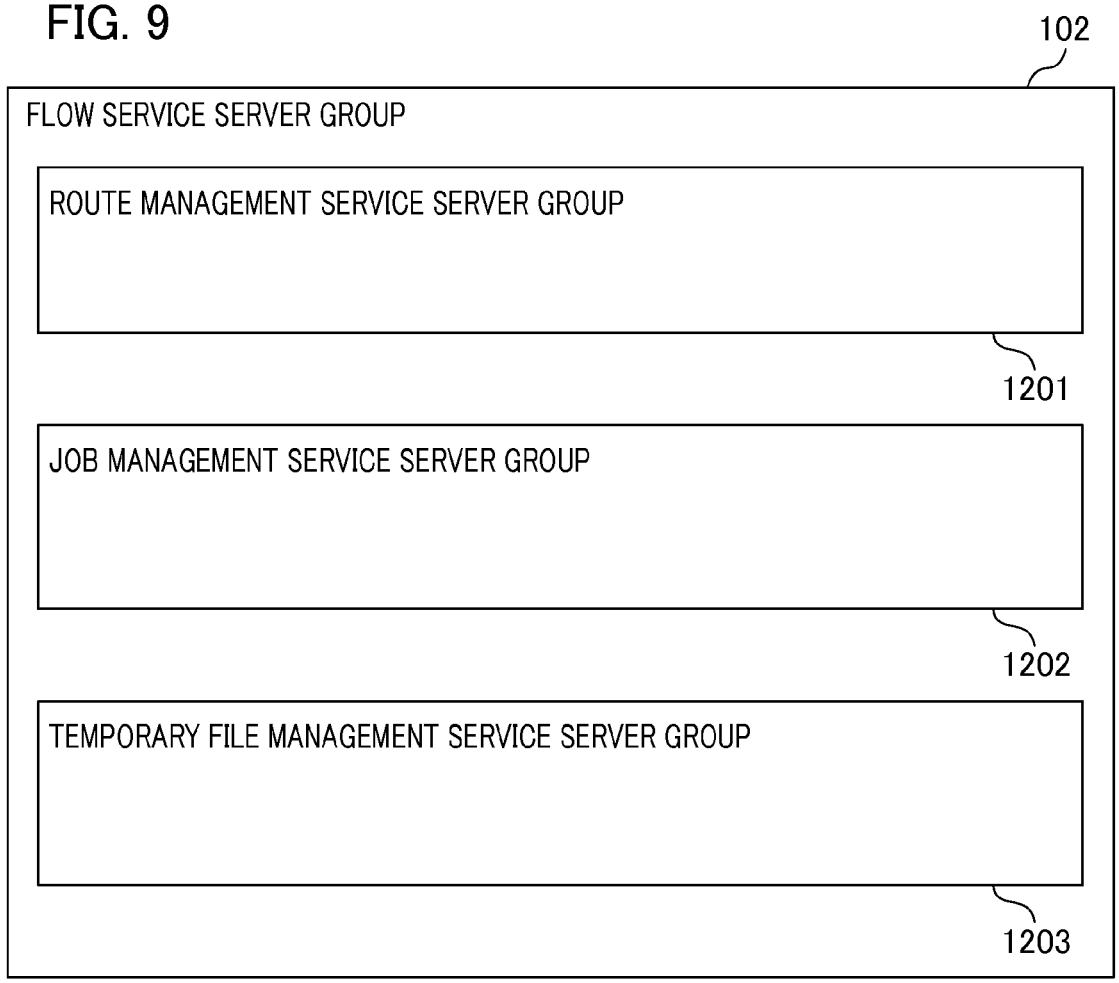
FIG. 9 illustrates an exemplary configuration of a flow service server group.

FIG. 9 is a drawing which illustrates an exemplary configuration of a flow service server group. The flow service server group 102 is a service server group which conducts route management, job management, and temporary file management. The flow service server group 102 is provided with a route management service server group 1201, a job management service server group 1202, and a temporary file management service server group 1203. The route management service server group 1201 manages route information. The job management service server group 1202 manages job processing based on route information.

The temporary file management service server group 1203 manages storage of data existing at the time of job input and data resulting from the respective task processing. Specifically, the temporary file management service server group 1203 stores files in response to requests from the scan service server group 101 and the task servers (103, 104), and manages the path to the storage destination. In the case of a file acquisition request from a task server, the scan service server group 101 returns the binary data of the saved file to the task server. In the case of a file deletion request from a task server or the job management service server group 1202, the temporary file management service server group 1203 deletes the saved file. By utilizing the functions of the temporary file management service server group 1203, the scan service server group 101 and the task servers can carry out file saving, acquisition, and deletion without regard to the path of the file storage destination or the status of the file server.

Figure 10:
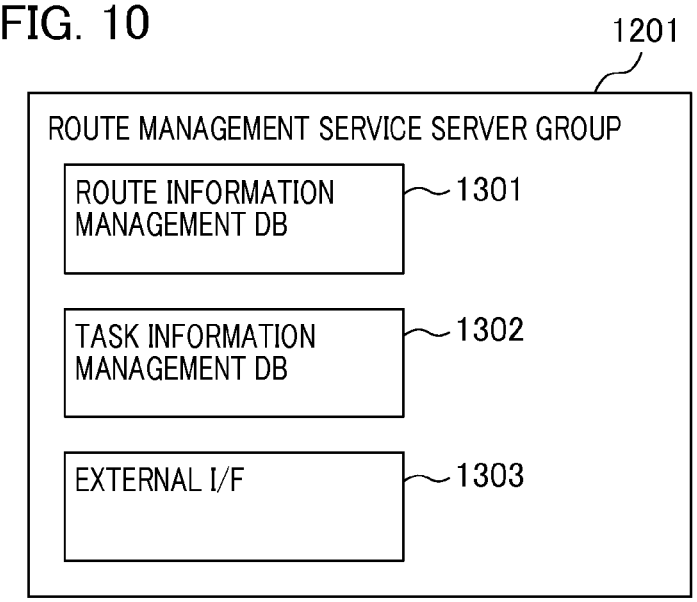
FIG. 10 illustrates an exemplary configuration of a route management service server group.

FIG. 10 is a drawing which illustrates an exemplary configuration of a route management service server group. The route management service server group 1201 is provided with a route information management DB 1301, a task information management DB 1302, and an external I/F 1303. The route information management DB 1301 retains route information. The task information management DB 1302 retains information relating to tasks (task information). In this example, a task indicates a processing unit contained within a job. The external I/F 1303 is an I/F used for inquiries to the route management service server group 1201. The job management service server group 1202 and other groups reference the route information management DB 1301 and the task information management DB 1302 via the external I/F 1303.

Figure 11:
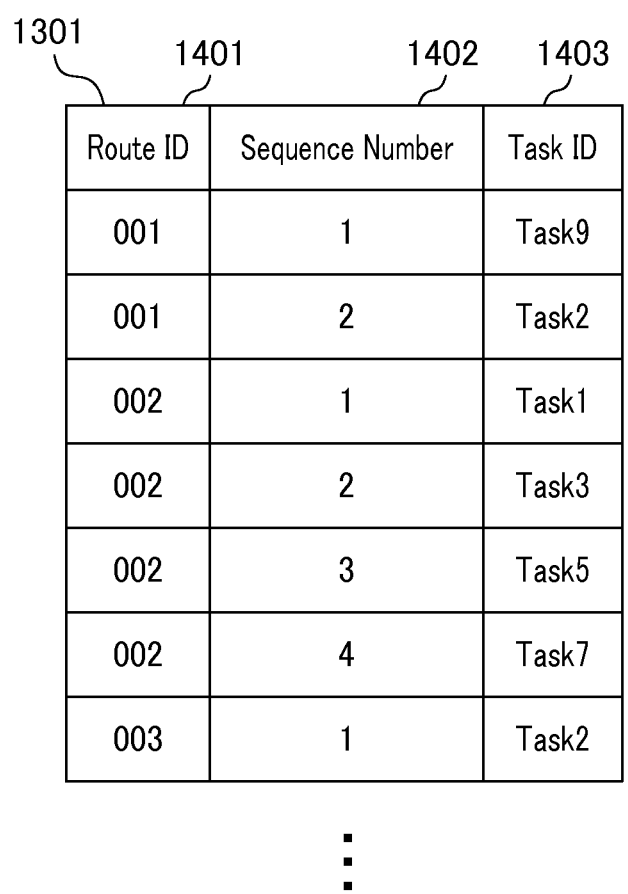
FIG. 11 illustrates an example of a route information management DB.

FIG. 11 is a drawing which illustrates one example of a route information management DB. Route information has the data items of a route ID 1401, a sequence number 1402, and a task ID 1403. The route ID is identification information which uniquely identifies a route. The task ID 1403 is identification information which uniquely identifies the tasks configuring each route, i.e., the tasks contained in the job that implements processing corresponding to the template selected by the user.

The sequence number 1402 is a number which indicates the sequential order of execution of a given task in a route containing that task. In other words, the sequence number 1402 is processing sequence information which indicates the sequential order of execution within a job of a respective task that is a task contained in a job corresponding to a route. Therefore, the route information management DB 1301 functions as a processing sequence information storage unit which stores route information including processing sequence information.

When FIG. 11 is referenced, for example, the route with route ID 002 contains Task 1, Task 3, Task 5, and Task 7 in order of ascending sequence numbers. Therefore, among the tasks contained in the job corresponding to this route, the task to be executed first of all is Task 1, the task to be executed second is Task 3, the task to be executed third is Task 5, and the task to be executed forth is Task 7.

FIG. 12 is a drawing which shows one example of a task information management DB. The task information management DB 1302 is a task information storage unit which stores task information. Task information has the data items of a task ID 1501, a task name 1502, a suspension time 1503, a status notification time 1504, a maximum processing time (real measurement) 1505, and a maximum processing time (projection) 1506.

The task ID 1501 is identification information which uniquely identifies a task. The task may 1502 is the name of a task. The suspension time 1503 is the time at which the job management service server group 1202 transfers a job from the task server (103 or 104) in the process of executing task processing to the other task server in the case where task processing is not completed by that time.

In the case where the task server in the process of executing a task does not complete task processing within a prescribed time, i.e., within the time set as the suspension time 1503 corresponding to this task, the job management service server group 1202 discriminates that an anomaly has occurred in the task server in the process of executing this task. The job management service server group 1202 then executes the following processing. First, the job management service server group 1202 delivers this task to another task server. Specifically, the job management service server group 1202 issues a command (an alternative execution command) to a task server capable of task processing identical to the task processing in the process of execution to alternatively carry out the task processing. The job management service server group 1202 also issues a command (a suspension command) at a prescribed timing to the task server in which the anomaly occurred to suspend task processing. By this means, the job processing is transferred to the other task server.

A variety of anomalies may arise in task servers such as occurrence of hardware malfunctions and software bugs, loss of communication due to network interruptions, and the like. Furthermore, for example, when there is a massive amount of data to be processed such as during image processing or during storage processing conducted with respect to an external cloud, the task server is in a prolonged state of execution. In such cases, as well, occurrence of an anomaly is discriminated.

In the present embodiment, the job management service server group 1202 issues a command to suspend task processing through responsive processing conducted in response to a status notification received from the task server in which the anomaly occurred. This responsive processing is described below with reference to FIG. 17. Of course, the job management service server group 1202 may also issue a command to suspend task processing to the task server in which the anomaly occurred simultaneous with delivery of the task to the other task server.

The status notification time 1504 is the time (notification time interval) at which the job management service server group 1202 issues a status notification to a task server. Maximum processing time (real measurement) and maximum processing time (projection) are processing times corresponding to the processing content of a respective task. The maximum processing time (real measurement) 1505 is the maximum value among actually measured values of the processing time of a pertinent task conducted by a task server. For example, the job management service server group 1202 determines and sets the suspension time 1503 based on the maximum processing time (real measurement) 1505. The job management service server group 1202 may also set the value of the maximum processing time (real measurement) 1505 itself as the suspension time 1503. In addition, the job management service server group 1202 may also set the value of which a predetermined extension time is added relative to the maximum processing time (real measurement) 1505 as the suspension time 1503. Otherwise, the method of determining the suspension time 1503 is not limited to the foregoing methods.

The maximum processing time (projection) 1506 is the projected maximum processing time among processing times of the task. In this example, the task server 103 conducts processing of image data. Accordingly, the job management service server group 1202 measures in advance the processing time for the maximum amount of image data that can be managed by the temporary file management service server group 1203, and computes and sets the maximum processing time (projection) 1506 based on this measurement result. Moreover, in this example, the task server 104 conducts processing which uploads and stores the image data. Accordingly, the job management service server group 1202 can compute the maximum processing time (projection) 1506 from the time required to upload the maximum amount of image data that the cloud service server group 108 permits to be uploaded. Otherwise, the job management service server group 1202 may compute the maximum processing time (projection) 1506 from the upload timeout value of the cloud service server group 108. The method for computing the maximum processing time (projection) 1506 is not limited to the foregoing methods.

The maximum processing time (projection) 1506 may be used as a factor in determining the suspension time 1503. For example, the value of the maximum processing time (projection) 1506 itself may be set as the suspension time 1503, or the value of which a predetermined extension time relative is added to the maximum processing time (projection) 1506 may be set as the suspension time 1503. As stated above, the job management service server group 1202 determines the transfer of a job from the task server in the process of executing task processing to the other task server based on the suspension time set in the task information management DB 1302. That is, the job management service server group 1202 varies the timing of issuance of the aforementioned suspension command and alternative execution command according to a task processing time corresponding to the processing content of a task.

FIG. 13 is a drawing which illustrates an exemplary configuration of a job management service server group. The job management service server group 1202 delivers tasks in response to task requests (task acquisition requests) from the task servers (103, 104). A task acquisition request is a request to acquire a task. A task server in processing standby status transmits task acquisition requests according to a prescribed polling time. The job management service server group 1202 also manages the status of each task.

The job management service server group 1202 is provided with an external I/F 1601, a job information management DB 1602, a job addition unit 1603, a job information acquisition unit 1604, a job information updating unit 1605, and a job status notification unit 1606.

The external I/F 1601 is an interface for communication between a task server and the image forming apparatus 107. Access to the various functions of the job management service server group 1202 is achieved through the external I/F 1601. The job information management DB 1602 stores the job information. Job information includes information concerning a task that is currently foremost in the processing sequence among the multiple tasks included in a job, a status of the task, and a final notification time at which notification that task processing is in progress will be received from the task server in the process of executing the task.

The job addition unit 1603 stores the job information concerning the job that is input by the scan service server group 101 in the job information management DB 1602. In response to a task acquisition request from a task server, the job information acquisition unit 1604 acquires the job information corresponding to the task that is to be processed by the task server that issued the request from the job information management DB 1602, and delivers it to the task server. Delivery of this job information to the task server is described in the present specification as "delivery of a task."

The job information updating unit 1605 updates job information in the job information management DB 1602 in response to a job information updating request from a task server. A job information updating request is a request to update job information. The job status notification unit 1606 accepts status notifications from a task server. The task server issues a status notification at the status notification time interval that corresponds to itself.

FIG. 14 is a drawing which illustrates one example of a job information management DB. The job information management DB 1602 is a job information storage unit which stores job information. Job information has the data items of a job ID 1701, a route ID 1702, a file group ID 1703, a current task ID 1704, and a status 1705. This job information also has the data items of a final updating time 1706, parameters 1707, a time stamp 1708, and a final status notification time 1709.

The job ID 1701 is identification information which uniquely identifies job information. The route ID 1702 is identification information which uniquely identifies a route. The route ID 1702 establishes the route ID of the route corresponding to the template selected in the ticket creation screen 601 of FIG. 5.

The file group ID 1703 is identification information which uniquely identifies a file group relating to image data contained in a job. The current task ID 1704 is identification information which uniquely identifies which of the tasks included in a pertinent job is the current task that is currently foremost in the processing sequence. The job information acquisition unit 1604 of the job management service server group 1202 identifies a record (a one-line portion of data) wherein the task ID set in the current task ID 1704 matches the task ID assigned to the task server that issued the task acquisition request. The job information acquisition unit 1604 then delivers the current task corresponding to the identified record to the task server.

In the case where processing of a task is completed, the job information updating unit 1605 identifies the route ID contained in the record corresponding to the task. Referencing the route information management DB 1301, the job information updating unit 1605 determines which of the tasks corresponding to the aforementioned identified route ID is the task to be processed next to the task for which processing has been completed. The job information updating unit 1605 then updates the current task ID corresponding to the aforementioned record of the job information management DB 1602 to the task ID of the aforementioned determined task.

The status 1705 is the status of the pertinent task. Specifically, "0" indicating a processing standby status, "1" indicating a status of execution in progress, or "2" indicating an error occurrence is set in the status 1705. The job information updating unit 1605 updates the status 1705 to 0 in the case where processing of the task is completed.

When the job information acquisition unit 1604 selects a task that is delivered to a task server, a record in which the status is 1 is selected. By this means, it is possible to prevent a situation in which multiple tasks servers process the same task. When a task is delivered to a task server, the job status updating unit 1605 changes the status 1705 from 0 to 1.

The final updating time 1706 is the final updating time of the job information. When the status of a task is updated, or when a task is delivered to a task server, the final updating time 1706 is updated to the current time. In the case where records multiply exist in which the task ID assigned to the task server that issued the task acquisition request is identical to the current task ID, the job information acquisition unit 1604 selects the record in which the final updating time 1706 is oldest, and delivers the task corresponding to the selected record. By this means, it is possible to evenly process all jobs.

The setting information that is set using the detailed setting screen 605 (FIG. 5) and the setting information that is delivered by a task server to the other task server are set in the parameters 1707. The time stamp 1708 is characteristic information that is automatically updated whenever the job information is updated. For example, the time stamp 1708 is updated whenever a task in the process of task processing is transferred to the other task server.

During communication between a task server and the job information updating unit 1605 and the job status notification unit 1606, it can be guaranteed that the job has not been transferred to the other task server by conducting transmittal of a time stamp. The final status notification time 1709 is a final time at which a status notification is received from the task server in the process of executing task processing. The job information acquisition unit 1604 transfers a job to the other task server in the case where the suspension time 1503 has elapsed from the final status notification time 1709.

Figure 15:
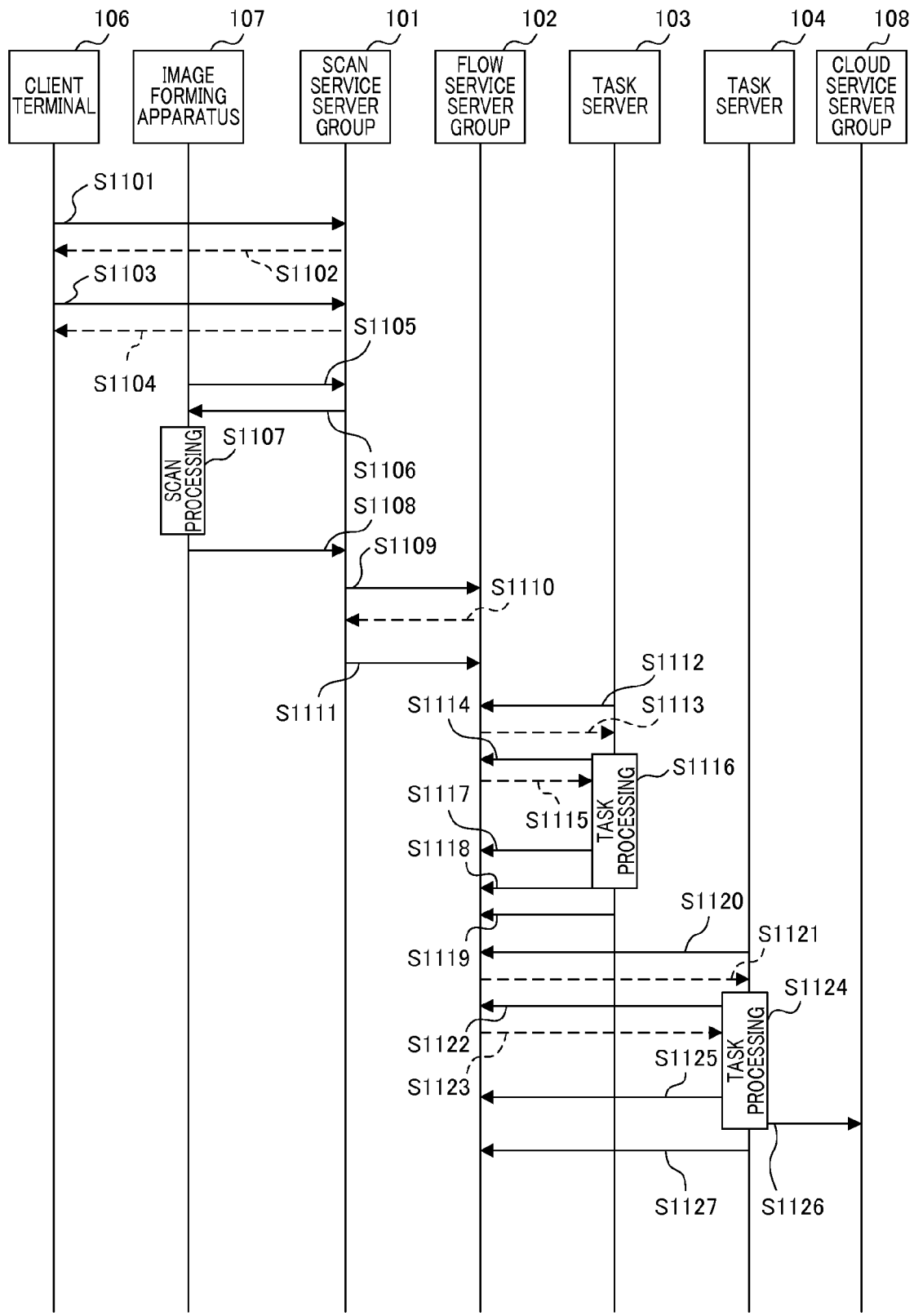
FIG. 15 is a sequence diagram which explains an example of operational processing of the information processing system of the present embodiment.

FIG. 15 is a sequence drawing which describes an example of operational processing of the information processing system of the present embodiment. First, the web browser 301 with which the client terminal 106 is provided transmits a scan ticket creation screen request to the scan service server group 101 (S1101). Subsequently, the ticket creation unit 511 with which the scan service server group 101 is provided generates a scan ticket creation screen in accordance with the scan ticket creation screen request, and returns it to the web browser 301 in response (S1102). Specifically, the ticket creation unit 511 acquires the scan ticket template registered in the template management DB 503 from the template management unit 516. The ticket creation unit 511 then creates a scan ticket creation screen including the template name contained in the acquired template, and transmits it to the web browser 301. The web browser displays the received scan ticket creation screen (FIG. 5).

Next, the web browser 106 transmits the scan ticket creation request to the scan service server group 101 in accordance with user manipulation of the scan ticket creation screen (S1103). The ticket creation unit 511 with which the scan service server group 101 is provided creates a scan ticket in accordance with the scan ticket creation request. In addition, the ticket management unit 515 saves the created scan ticket in the ticket management DB 502, and returns a response to the web browser 301.

Next, the scan software unit of the image forming apparatus 107 transmits a ticket list acquisition request to the ticket list unit 512 via the external I/F 514 (S1105). The ticket list acquisition request is a request for transmission of a ticket list. The ticket list unit 512 generates a ticket list in accordance with the ticket list acquisition request, and returns it to the web browser 301 (S1106). The web browser 301 displays the returned ticket list on the ticket list screen (FIG. 6).

Next, the scan software unit of the image forming apparatus 107 executes scan processing in accordance with user manipulation of the ticket list screen, and acquires the image data (S1107). The scan software unit then transmits the image data acquired by the aforementioned scan processing and the scan ticket selected by user manipulation of the ticket list screen to the scan receiving unit 513 of the scan service server group 101 (S1108).

Next, the scan receiving unit 513 inputs the received image data into the flow service server group 102 (S1109). In the case where the flow service server group 102 has correctly received the image data, the flow service server group 102 responds to the scan service server group 101 with the file group corresponding to the received image data (S1110). Subsequently, the scan receiving unit 513 of the scan service server group 101 transmits the file group ID and the scan ticket to the flow service server group 102. By this means, the job is input into the flow service server group 102 (S1111).

Next, a description is given of the processing whereby the flow service server group 102 delivers a job in response to a task acquisition request from a task server. The task acquisition unit 1011 of the respective task server (103, 104) periodically issues an inquiry (a task acquisition request) to the flow service server group 102. The task acquisition unit 1011 then acquires the tasks that are capable of processing by the task server (S1112, S1113, S1120, S1121). The responsive processing of the flow service server group 102 to the task server is described below with reference to FIG. 16.

The data acquisition unit 1012 of the task server acquires the image data to be processed from the flow service server group 102, in accordance with the task(s) acquired by the task acquisition unit 1011 (S1114, S1115, S1122, S1123). The task processing unit 1015 of the task server executes a variety of processing (task processing) with respect to the image data acquired from the flow service server group 102 (S1116, S1124).

In addition, the task status notification unit 1014 of the task periodically issues a status notification to the flow service server group 102 (S1117, S1125). The responsive processing by the flow service server group 102 to status notifications from the respective task servers is described below with reference to FIG. 17.

In the example shown in FIG. 15, the task processing unit 1015 of the task server 103 stores the results of task processing in S1116 in the flow service server group 102 via the data storage unit 1013 (S1118). The task processing unit 1015 of the task server 104 conducts data transmission of the results of task processing in S1124 to the cloud service server group 108 (S1126).

The respective task status notification units 1014 of the task servers (103, 104) notify the flow service server group 102 of the termination results of the series of task processing operations (S1119, S1127).

Figure 16:
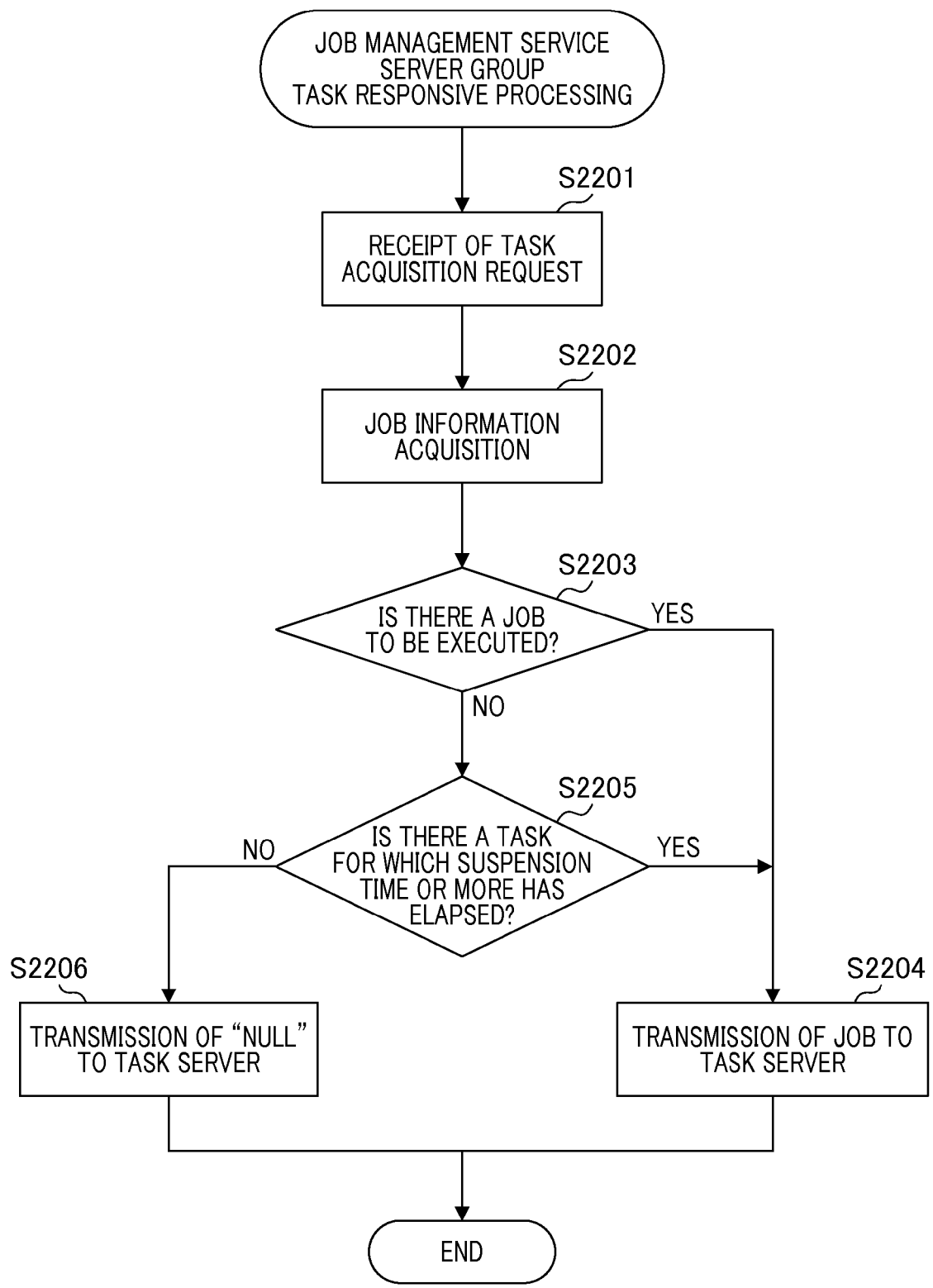
FIG. 16 is a flowchart which explains an example of responsive processing of a flow service server group to a task acquisition request.

FIG. 16 is flow chart which describes an example of responsive processing of a flow service server group to a task acquisition request. First, the job information acquisition unit 1604 of the job management service server group 1202 receives a task acquisition request from the task server (S2201). The task acquisition request includes a task ID assigned to the task server that issued the task acquisition request.

Next, the job information acquisition unit 1604 references the job information management DB 1602 to acquire the job information (S2202). Subsequently, the job information acquisition unit 1604 consults with the job information management DB 1602 to discriminate whether or not there is a job to be executed (S2203). Specifically, the job information acquisition unit 1604 discriminates whether or not there is a record in the job information management DB 1602 wherein the status is processing standby "0," and the current status ID is identical to the task ID contained in the task acquisition request. In the case where the status is processing standby "0," and the current status ID is identical to the task ID contained in the task acquisition request, the job information acquisition unit 1604 discriminates that there is a job to be executed. In S2204, the job information acquisition unit 1604 then delivers the task corresponding to the current task ID contained in the pertinent record to the task server that issued the task acquisition request (transmits the job).

In the case where the status is processing standby "0," but there is no record in which the current status ID is identical to the task ID contained in the task acquisition request, the job information acquisition unit 1604 discriminates that there is no job to be executed. Processing then advances to S2205.

In S2205, the job information acquisition unit 1604 discriminates whether there is a task in the process of execution for which the suspension time 1503 or more has elapsed (S2205). A description of the discrimination processing of S2205 is given below. First, among the entries in the job information management DB 1602, in the case where there is an entry in which the current task ID is identical to the task ID corresponding to the task acquisition request, the job information acquisition unit 1604 executes the following processing. The job information acquisition unit 1604 references the job information management DB 1602 to acquire the final status notification time contained in the entry in which the status is in process of execution "1" among the entries corresponding to this task ID. A status in the process of execution "1" signifies that the task corresponding to this entry is being executed by a task server that is different from the task server that issued the task acquisition request.

The job information acquisition unit 1604 also references the task information management DB to acquire the suspension time corresponding to this task ID. The job information acquisition unit 1604 then discriminates whether the acquired suspension time or more has elapsed from the acquired final status notification time. In the case where the acquired suspension time or more has elapsed from the acquired final status notification time, it is discriminated that there is a task in the process of execution for which the suspension time or more has elapsed, and the processing advances to S2204. In S2204, the job information acquisition unit 1604 then delivers the task in the process of execution for which the pertinent suspension time or more has elapsed together with an alternative execution command to the task server that issued the task acquisition request (transmits the job).

The task server that issued the task acquisition request executes task processing with respect to the received task. In addition, with respect to the task server in the process of executing processing of the task even if the pertinent suspension time or more has elapsed, the job information acquisition unit 1604 issues—at a prescribed timing—a command to suspend this task processing. By this means, it is possible to transfer processing from a task server in the process of executing task processing to another task server.

In the case where the acquired suspension time or more has not elapsed from the acquired final status notification time, it is discriminated that there is no task in the process of execution for which the suspension time or more has elapsed, and the processing advances to S2206. Moreover, in the case where there is no entry in which the current task ID is identical to the task ID corresponding to the task acquisition request among the entries in the job information management DB 1602, the job information acquisition unit 1604 also discriminates that there is no task in the process of execution for which the suspension time 1503 or more has elapsed. The processing then advances to S2206.

In S2206, the job information acquisition unit 1604 transmits "null," which is information indicating that the task server that issued the task acquisition request has no tasks to be executed, to this task server (S2205). The task server that receives "null" again issues a task acquisition request after a fixed period of time.

From the processing described with reference to FIG. 16, the job management service server group 1202 discriminates based on the job information whether the status of a task which matches the task corresponding to the task request and which is currently foremost in the processing sequence is that execution is in progress. In the case where the status of the pertinent task is that execution is in progress (NO in S2203), the job management service server group 1202 discriminates whether the prescribed time has elapsed from the final status notification time (S2205). In the case where the prescribed time has elapsed from the final status notification time (YES in S2205), a job management service server group 1202 then issues a command to the task server that issued the task request to alternately execute processing of the task that is in the process of execution (S2204).

Figure 17:
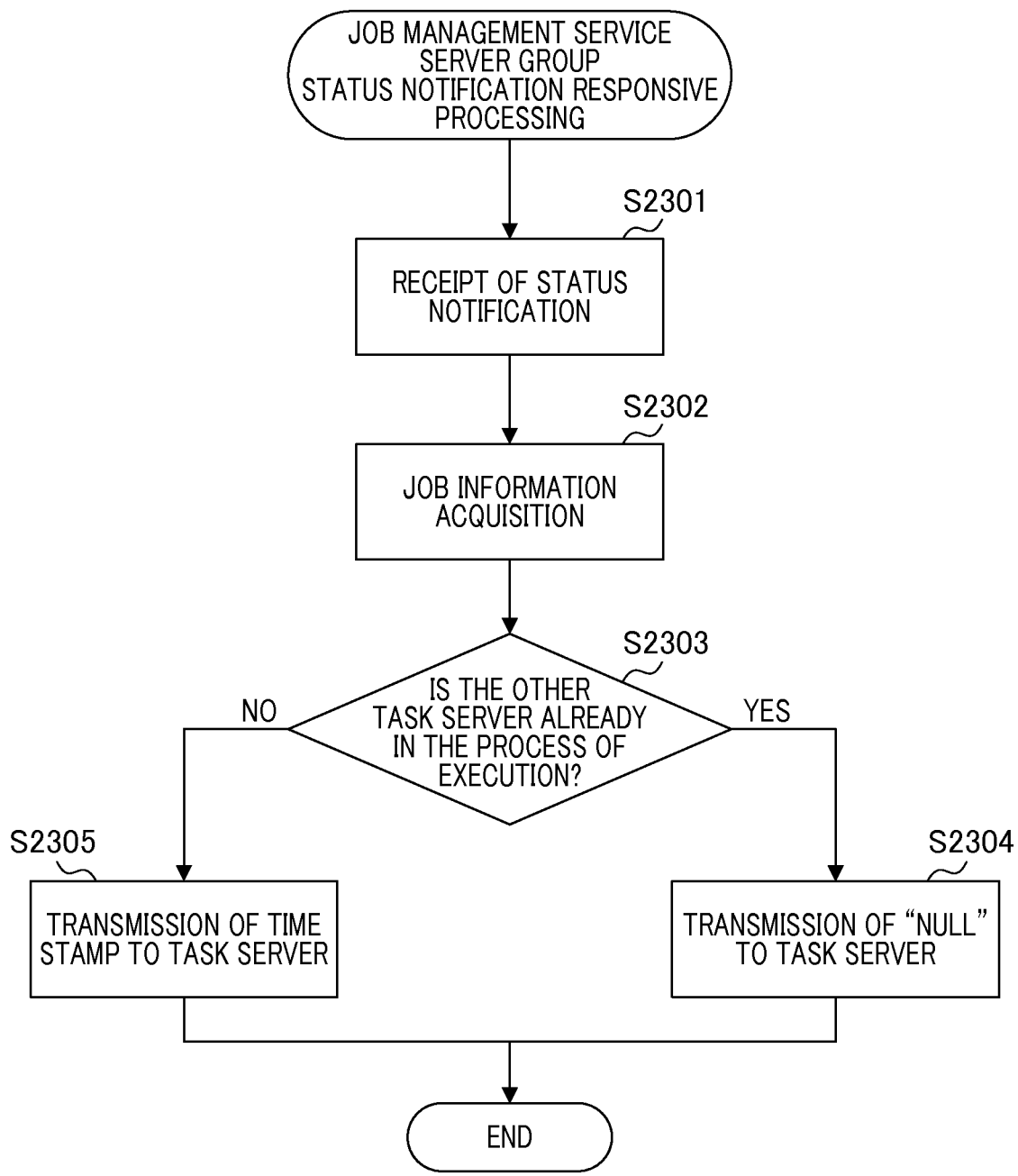
FIG. 17 is a flowchart which explains an example of responsive processing of a flow service server group to a status notification.

FIG. 17 is a flowchart which describes an example of responsive processing of a flow service server group to a status notification. In this responsive processing, in the case where the job management service server group 1202 receives a status notification from a task server in the process of executing task processing, it suspends the task processing of the task server that transmitted the status notification if the other task server is already in the process of processing the same task.

First, the job status notification unit 1606 of the job management service server group 1202 receives a status notification from a task server (S2301). This status notification includes the task ID of the task server that transmitted the status notification, the job ID corresponding to the task that is being processed by this task server, and the time stamp.

Next, the job information acquisition unit 1604 references the job information management DB 1602 (S2302). The job information acquisition unit 1604 then discriminates whether the task being processed by the task server that transmitted the status notification (that is the source of the notification) is already being executed by the other task server, i.e., whether the job has been transferred to the other task server (S2303).

Specifically, the job information acquisition unit 1604 discriminates whether job information exists which corresponds to the set of task ID, job ID, and time stamp contained in the status notification. Now, in the case where the job has been transferred to the other task server, the time stamp is updated. Therefore, in the case where there exists no job information corresponding to the set of task ID, a job ID, and time stamp contained in the status notification, the job information acquisition unit 1604 discriminates that the pertinent task is already being executed by the other task server, and the processing advances to S2304.

In S2304, the job information acquisition unit 1604 transmits "null" to the task server that transmitted the status notification. In this example, the pertinent transmission of "null" is issuance of a command to suspend task processing. The task server which receives "null," i.e., a command to suspend task processing suspends task processing in accordance with this command. By this means, this task server can recommence issuing inquiries for the task to be executed next. By this means, it is possible to prevent a task server from wastefully expending computer resources due to execution of wasteful processing, and prevent occurrence of inconsistencies in external systems due to the conduct of double processing.

If job information exists corresponding to the set of task ID, job ID, and time stamp contained in the status notification, the job information acquisition unit 1604 discriminates that the task is not being processed by the other task server, and the processing advances to S2305. The job information updating unit 1605 then updates the time stamp, and transmits the updated time stamp to the task server that transmitted the status notification (S2305).

As described above, in Embodiment 1, processing of a task in the process of execution can be suitably suspended if the job has been transferred. By this means, it is possible to increase the throughput of processing of a series of jobs without having the tasks wastefully expend computer resources, and achieve a system which does not cause inconsistencies in external systems to occur.

That is, according to the information processing system of the present invention, it is possible to prevent a waste of computer resources which may arise in cases where an anomaly occurs in a back-end unit that executes job processing by non-synchronously acquiring tasks contained in a job, and where the job processing is transferred to another back-end unit.

(Embodiment 2)

In the case where the frequency of transmission of task acquisition requests is high when the task servers (103, 104) transmit task acquisition requests at fixed intervals to the job management service server group 1202, network bandwidth is wasted. On the other hand, when the frequency of transmission of task acquisition requests is lowered, the waiting time until job is executed increases, reducing system throughput. Therefore, it is necessary to optimize the transmission intervals for task acquisition requests. Moreover, as transmission of status notifications from a task server is also a cause of waste of network resources, it is desirable to decrease the transmission of status notifications as much as possible. Thus, in Embodiment 2, the transmission intervals for task acquisition requests and the intervals for status notifications by a task server are optimized.

Figure 18:
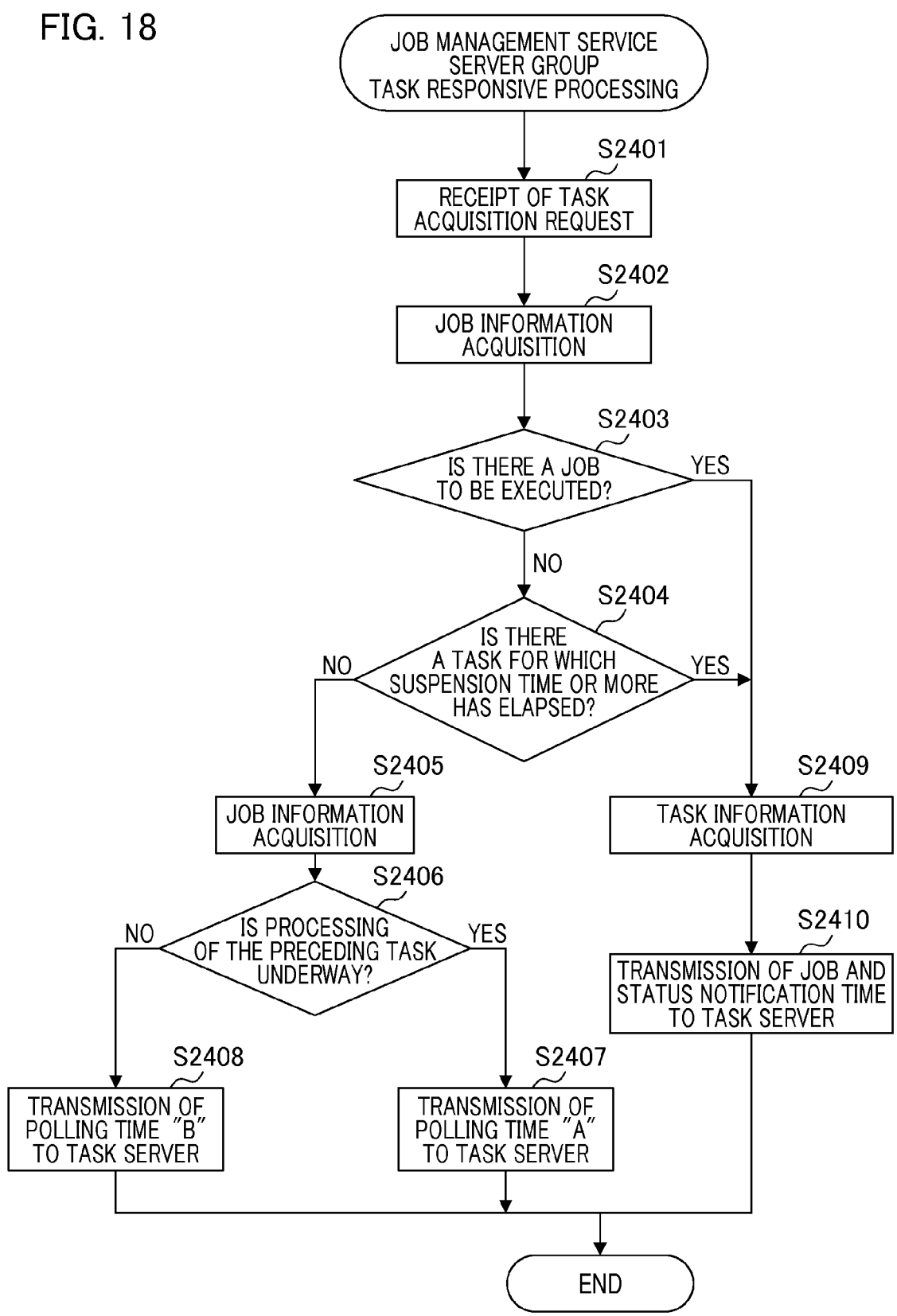
FIG. 18 is a flowchart which explains an example of responsive processing of a flow service server group to a task acquisition request in Embodiment 2.

FIG. 18 is a flowchart which explains an example of responsive processing of a flow service server group to a task acquisition request. S2401, S2402, S2403, and S2404 are respectively identical to S2201, S2202, S2203, and S2205 of FIG. 16.

In S2409, the job information acquisition unit 1604 acquires the task information corresponding to the task ID assigned to the task server that issued the task acquisition request. The job information acquisition unit 1604 then transmits the task to be executed and the status notification time contained in the task information acquired in the aforementioned S2409 to the task server that issued the task acquisition request (S2410). The task server that received the status notification time from the job information acquisition unit 1604 conducts the next status notification at the time interval of this status notification time. Now, when FIG. 12 is referenced, the status notification time received by the task server is varied according to the content of the task and the maximum processing time. Therefore, the task server that receives this status notification time varies the time interval for conducting the status notification according to the task processing time.

Among the task information saved in the task information management DB 1302 shown in FIG. 12, a description is given of the example of Task 1 and Task 2 that respectively have the task IDs of "Task1" and "Task2." In the case where there is no status notification from a task server within the fixed time, the job management service server group 1202 discriminates that an anomaly has occurred in the task server, and transfers the job to the other task server. Now, as Task 1 is a task in which image processing is conducted that converts PDF to PDL, the maximum processing time (projection) is set relatively long at 600 seconds. This is because image processing may require a large amount of time due to the quality of processing and the parameters. Moreover, Task 2 is a task which saves data to an external cloud (Cloud 1 in the present embodiment).

Generally, a timeout time is set in the connection to the cloud. For example, 30 seconds is the timeout in the case of Cloud 1. Therefore, the maximum processing time (projection) of Task 2 is set to 30 seconds. For example, in the case where the status notification time is fixed at 30 seconds for all task servers, the task notification time would be appropriate for Task 2, but would be too short for Task 1. As Task 1 is a task that requires a maximum of 600 seconds, this would result in the occurrence of wasted communication for 20 notifications.

For example, in the case where the status notification time is set to 600 seconds for all task servers, it would be an appropriate status notification time for Task 1, but would be too long as a status notification time for Task 2. This is because, as Task 2 is a task which is completed in 30 seconds, the job management service server group 1202 should conduct detection more quickly if an anomaly arises. In the present embodiment, an optimal status notification time is designated by the job management service server group 1202 according to the job content. Therefore, the status notification frequency can be reduced, thereby enabling inhibition of waste of computer resources and network resources of a job management service server group.

Returning to FIG. 18, in the discrimination processing of S2404, when the job information acquisition unit 1604 discriminates that the suspension time or more has elapsed and that there is no task in the process of execution, the processing advances to S2405.

Next, the job information acquisition unit 1604 acquires the information of the job in the process of execution—i.e., the job information in which the corresponding status is set to "1"—from the job information management DB 1602. The job information acquisition unit 1604 identifies the task that is shown by the current task ID included in the acquired job information and that is currently foremost in the processing sequence, i.e., the task in the process of execution. In addition, the job information acquisition unit 1604 acquires the route information corresponding to the route ID contained in the acquired job information (S2405). Based on the task IDs and the sequence numbers contained in the acquired route information, the processing sequence in the pertinent route of the tasks corresponding to the respective task IDs is checked (S2405).

Next, based on the results of the checking in S2405, the job information acquisition unit 1604 discriminates whether the task that precedes in processing sequence the task that is to be executed by the task server that issued the task acquisition request is in the process of execution (S2406). That is, the job information acquisition unit 1604 discriminates the processing sequence relationship of the task that is currently foremost in the processing sequence and the task for which a task request was issued, and determines the status of progress of the task processing that precedes the task processing of the task for which a task request was issued.

In this example, in the case where the task ID of the task that is in processing sequence next to the task currently being executed matches the task ID of the task server that issued the task acquisition request, the job information acquisition unit 1604 executes the following processing. The job information acquisition unit 1604 discriminates that the task that precedes in processing sequence the task to be executed by the task server is being processed, i.e., the job information acquisition unit 1604 discriminates that the task server that issued the task acquisition request is the task server that is to execute task processing in the near future. The job information acquisition unit 1604 then transmits a time "a" as a polling time, i.e., as a task acquisition request transmission interval to the task server that issued the task acquisition request (S2407). The task server that receives the polling time "a" again transmits task acquisition requests to the job management service server group 1202 when the polling time "a" elapses.

Here, the polling time "a" is preset to the shortest time that is permissible by the job management service server group 1202 based on the network I/O limit of the job management service server group 1202 or the CPU, memory, or the like.

In this example, in the case where the task ID of the task that is in processing sequence next to the task currently in the process of execution does not match the task ID of the task server that issued the task acquisition request, the job information acquisition unit 1604 executes the following processing. The job information acquisition unit 1604 discriminates that the task in processing sequence that precedes the task to be executed by the task server is being processed, i.e., that the sequence of the task processing conducted by the task server that issued the task acquisition request is delayed. The job information acquisition unit 1604 then transmits a polling time "b" which is longer than (e.g., twice the time of) the polling time "a" to the task server that issued the task acquisition request (S2408).

The task server which received the polling time "a" again transmits task acquisition requests to the job management service server group 1202 when the polling time "b" elapses. That is, the job information acquisition unit 1604 changes the polling time according to the state of progress of the task processing that precedes the task processing of the task for which a task request was issued, and notifies the task server that issued the task request of the changed polling time. The task server issues the next task acquisition request after the notified polling time has elapsed. In short, when observed from the task server side, the task server changes the time interval at which task acquisition requests are transmitted according to the state of progress of the task processing that precedes the task processing that the task server is to execute.

Otherwise, in this example, the discrimination processing in S2406 is always conducted according to the standard of whether the task that is first before the task to be executed by the source of the task acquisition request is being executed, but the standard for discrimination processing in S2406 is not limited to this standard. For example, it is also acceptable to have a discrimination standard of whether or not the task that is second or third before is being processed.

According to the present embodiment, it is possible to have the task server that issues task acquisition requests to conduct the next task acquisition request at an optimal polling time according to the state of progress of task processing. In addition, according to the present embodiment, it is possible to have the task server conduct the next status notification at an optimal time interval according to the content of task processing. Therefore, the throughput of job execution can be improved while inhibiting waste of network resources.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-131672 filed Jun. 11, 2012, which is hereby incorporated by reference herein in its entirety.

What is claimed is:
1. An information processing system comprising:
a processor and a memory, the processor and the memory cooperating to function as:
a job management unit configured to manage a job consisting of multiple tasks that is generated in accordance with a user request; and
multiple back-end units configured to acquire tasks from the job management unit if a processing standby status exists and carry out specific task processing,
wherein the job management unit further comprises:
a processing sequence information storage unit configured to store processing sequence information that indicates processing sequence in which respective tasks included in the job are processed;
a task information storage unit configured to store task information which includes processing times corresponding to processing contents of the respective tasks and notification time intervals that are time intervals at which each back-end unit notifies the job management unit that a task processing is in progress; and
a job information storage unit configured to store job information including information including a task that is foremost in processing sequence among multiple tasks included in the job, a status of the task, and a final notification time at which a notification is received from the back-end unit in the process of executing the task that task processing is in progress;

wherein the back-end units periodically notify the job management unit that task processing is in progress, and wherein the job management unit which receives a task request from the back-end unit:

discriminates whether a status of a task, which matches the task for which the task request was issued and which is currently foremost in processing sequence, indicates that task processing is in progress based on job information stored in the job information storage unit;

discriminates whether a prescribed time has elapsed from the final notification time in the case where the status of the task, which matches the task for which the task request was issued and which is currently foremost in processing sequence, indicates that task processing is in progress;

issues a command to suspend task processing to the back-end unit that has not completed the task processing and issues a command to alternatively execute the task processing in the process of execution to the back-end unit that issued the task request in the case where the prescribed time has elapsed from the final notification time.

2. The information processing system according to claim 1, wherein the job management unit changes a timing at which the command is issued to suspend the task processing and the command is issued to alternatively execute the task processing according to a task processing time that corresponds to a task processing content.

3. The information processing system according to claim 1, wherein the back-end unit in processing standby status issues the task request at fixed time interval to the job management unit to inquire whether or not tasks exist and changes the fixed interval according to a status of progress of the task processing that precedes the task processing of the task for which the task request was issued.

4. The information processing system according to claim 1, wherein the back-end unit changes a time interval for notifying the job management unit that the task processing is in progress according to the task processing time.

5. The information processing system according to claim 1, wherein the job management unit determines the notification time interval corresponding to a processing content of a task delivered to a back-end unit that carries out the task processing based on the task information stored in the task information storage unit and transmits it to the back-end unit; and wherein the back-end unit that receives the notification time interval from the job management unit notifies the job management unit that the task processing is in progress at the received notification time interval.

6. The information processing system according to claim 1, wherein the job management unit that receives the task request from the back-end unit:

discriminates the processing sequence relationship of the task for which the task request was issued and a task that is currently foremost in the processing sequence included in job information stored in the job information storage unit to thereby determine a status of progress of task processing that precedes task processing of the task for which the task request was issued, based on processing sequence information stored in the processing sequence storage unit, in the case where the status of the task that matches the task for which the task request was issued and that is currently foremost in the processing sequence indicates that task processing is in progress and where a prescribed time has not elapsed from the final notification time; and changes a time interval at which the back-end unit issues task requests according to the determined status of progress and notifies the back-end unit of the changed time interval.

7. The information processing system according to claim 1, wherein the job information stored in the job information storage unit has characteristic information that is updated whenever task processing of a task included in the job information is alternatively executed;

wherein the notification from the back-end unit to the job management unit that task processing is in progress has the characteristic information and information indicating the task that is in the process of task processing; and wherein the job management unit:

discriminates whether the characteristic information and the information indicating the task of the notification are included in the job information stored in the job information storage unit in the case where the notification is issued from the back-end unit that task processing is in progress; and discriminates that another back-end unit different from the back-end unit that issued the notification is in the process of executing task processing of the task and issues a command to the back-end unit that issued the notification to suspend task processing in the case where the characteristic information and the information indicating the task of the notification are not included in the job information stored in the job information storage unit.

8. The information processing system according to claim 1, further comprising a job input unit configured to generate jobs consisting of multiple tasks according to requests from the user and input them to the job management unit.

9. An image forming apparatus configured to generate image data corresponding to jobs managed by the job management unit according to claim 1.

10. A method for controlling an information processing system comprising a job management unit configured to manage a job consisting of multiple tasks that is generated in accordance with a user request and multiple back-end units configured to acquire tasks from the job management unit if a processing standby status exists and carry out specific task processing, the method comprising:

storing processing sequence information that indicates processing sequence in which respective tasks included in the job are processed by the job management unit;

storing task information which includes processing times corresponding to processing contents of the respective tasks and notification time intervals that are time intervals at which each back-end unit notifies the job management unit that a task processing is in progress by the job management unit;

storing job information including information including a task that is foremost in processing sequence among multiple tasks included in the job, a status of the task, and a final notification time at which a notification is received from the back-end unit in the process of executing the task that task processing is in progress by the job management unit;

notifying the job management unit at a fixed time interval by the back-end unit that task processing is in progress during performance of the specific task processing;

discriminating, by the job management unit which receives the task request from the back-end unit, whether a status of a task, which matches the task for which task request was issued and which is currently foremost in processing sequence, indicates that task processing is in progress based on the stored ob information;

discriminating, by the job management unit which receives the task request from the back-end unit, whether a prescribed time has elapsed from the final notification time in the case where the status of the task, which matches the task for which the task request was issued and which is currently foremost in processing sequence, indicates that task processing is in progress; and ordering by the job management unit, the back-end unit that has not completed task processing to suspend the task processing and ordering, by the job management unit, the back-end unit that issued the task request to alternatively execute the task processing in the process of execution in the case where the prescribed time has elapsed from the final notification time.

11. A non-transitory storage medium on which is stored a computer program for making a computer execute a method for controlling an information processing system comprising a job management unit configured to manage a job consisting of multiple tasks that is generated in accordance with a user request and multiple back-end units configured to acquire tasks from the job management unit if a processing standby status exists and carry out specific task processing, the method comprising:

storing processing sequence information that indicates processing sequence in which respective tasks included in the job are processed by the job management unit;

storing task information which includes processing times corresponding to processing contents of the respective tasks and notification time intervals that are time intervals at which each back-end unit notifies the job management unit that a task processing is in progress by the job management unit;

storing job information including information including a task that is foremost in processing sequence among multiple tasks included in the job, a status of the task, and a final notification time at which a notification is received from the back-end unit in the process of executing the task that task processing is in progress by the job management unit;

notifying the job management unit at a fixed time interval by the back-end unit that task processing is in progress during performance of the specific task processing;

discriminating, by the job management unit which receives the task request from the back-end unit, whether a status of a task, which matches the task for which task request was issued and which is currently foremost in processing sequence, indicates that task processing is in progress based on the stored job information;

discriminating, by the job management unit which receives the task request from the back-end unit, whether a prescribed time has elapsed from the final notification time in the case where the status of the task, which matches the task for which the task request was issued and which is currently foremost in processing sequence, indicates that task processing is in progress; and ordering by the job management unit, the back-end unit that has not completed task processing to suspend the task processing and ordering by the job management unit, the back-end unit that issued the task request to alternatively execute the task processing in the process of execution, in the case where the prescribed time has elapsed from the final notification time.

* * * * *